(12) United States Patent
Netz et al.

(10) Patent No.: US 7,844,570 B2
(45) Date of Patent: Nov. 30, 2010

(54) DATABASE GENERATION SYSTEMS AND METHODS

(75) Inventors: Amir Netz, Bellevue, WA (US); Paul J. Sanders, Seattle, WA (US); Donald M. Farmer, Woodinville, WA (US); Kenneth Kwok, Issaquah, WA (US); Ovidiu Burlacu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 188 days.

(21) Appl. No.: 11/074,508

(22) Filed: Mar. 8, 2005

(65) Prior Publication Data

US 2006/0020619 A1    Jan. 26, 2006

Related U.S. Application Data

(60) Provisional application No. 60/586,541, filed on Jul. 9, 2004.

(51) Int. Cl.
     *G06F 7/00*      (2006.01)
     *G06F 17/30*      (2006.01)

(52) U.S. Cl. .................. 707/601; 707/605; 707/606; 707/803

(58) Field of Classification Search .............. None
See application file for complete search history.

(56) References Cited

U.S. PATENT DOCUMENTS

| | | | | |
|---|---|---|---|---|
| 5,937,410 | A * | 8/1999 | Shen ................... | 707/103 R |
| 6,205,447 | B1 * | 3/2001 | Malloy ................... | 707/102 |
| 6,233,583 | B1 | 5/2001 | Hoth | |
| 6,377,934 | B1 * | 4/2002 | Chen et al. ............... | 707/104.1 |
| 6,434,557 | B1 * | 8/2002 | Egilsson et al. ............. | 707/5 |
| 6,473,750 | B1 | 10/2002 | Petculescu et al. | |
| 6,651,055 | B1 | 11/2003 | Kilmer et al. | |
| 7,062,479 | B2 | 6/2006 | Edmunds et al. | |
| 2002/0116389 | A1 * | 8/2002 | Chen et al. ............... | 707/103 R |
| 2003/0208468 | A1 * | 11/2003 | McNab et al. ............. | 707/1 |
| 2003/0225736 | A1 * | 12/2003 | Bakalash et al. ............ | 707/1 |
| 2004/0044671 | A1 * | 3/2004 | Yoshimura et al. .......... | 707/100 |
| 2004/0123048 | A1 * | 6/2004 | Mullins et al. ............. | 711/141 |
| 2004/0181518 | A1 | 9/2004 | Mayo et al. | |
| 2004/0193567 | A1 | 9/2004 | Dettinger et al. | |

(Continued)

OTHER PUBLICATIONS

Microsoft BI Accelerator Overview, Chapter 1, Published: Jul. 10, 2002, 17 pages plus coversheet www.microsoft.com/sql/prodinfo/previousversions/ssabi/ch1overview.mspx.*

(Continued)

*Primary Examiner*—Yicun Wu
*Assistant Examiner*—Yu Zhao
(74) *Attorney, Agent, or Firm*—Workman Nydegger

(57) ABSTRACT

The subject invention pertains to systems and methods that facilitate generation of a database to support a multidimensional model. A database schema is generated in a top-down fashion. In particular, multidimensional structures and attributes such as cubes and dimensions can be defined. From such definition, a proposed database schema can be produced. This schema can subsequently be modified prior to or after populating the database. For example, a table or column could be added. Thereafter, the cubes and dimensions could be altered and a modified schema generated that preserves changes made to the schema. Accordingly, the subject systems and methods disclose an iterative approach that supports both top-down and bottom-up multidimensional database design.

5 Claims, 28 Drawing Sheets

U.S. PATENT DOCUMENTS

| | | | |
|---|---|---|---|
| 2005/0049831 | A1 | 3/2005 | Lilly |
| 2005/0071737 | A1 | 3/2005 | Adendorff et al. |
| 2005/0216831 | A1 | 9/2005 | Guzik et al. |
| 2005/0228818 | A1* | 10/2005 | Murthy et al. .............. 707/102 |
| 2005/0256896 | A1 | 11/2005 | Pfeifer et al. |
| 2006/0010164 | A1 | 1/2006 | Netz |
| 2006/0020933 | A1 | 1/2006 | Pasumansky |

OTHER PUBLICATIONS

Microsoft SQL 2000 Technical Articles, Analysis Services: Choosing Dimension Types in SQL Server 2000 Analysis Services, Published: Jul. 2000, 18 pages.*

SQL Server Accelerator for BI Overview. http://www.microsoft.com/sql/prodinfo/previousversions/ssabi/overview. mspx. Jun. 24, 2003, Last accessed Mar. 27, 2006. 4 pages.

MSDN Library, SQL Server 2000, Analysis Services (Analysis Services SQL Server). http://msdn.microsoft.com/ library/en-us/olapdmad/aggettingstart_80xj.asp?frame=true. 2006 Microsoft Corporation. Last accessed Mar. 27, 2006. pp. 1-101.

MSDN Library, SQL Server 2000, Analysis Services (Analysis Services SQL Server). http://msdn.microsoft.com/ library/en-us/olapdmad/aggettingstart_80xj.asp?frame=true. 2006 Microsoft Corporation. Last accessed Mar. 27, 2006. pp. 2-230.

MSDN Library, SQL Server 2000, Analysis Services (Analysis Services SQL Server). http://msdn.microsoft.com/ library/en-us/olapdmad/aggettingstart_80xj.asp?frame=true. 2006 Microsoft Corporation. Last accessed Mar. 27, 2006. pp. 231-330.

MSDN Library, SQL Server 2000, Analysis Services (Analysis Services SQL Server). http://msdn.microsoft.com/ library/en-us/olapdmad/aggettingstart_80xj.asp?frame=true. 2006 Microsoft Corporation. Last accessed Mar. 27, 2006. pp. 331-493.

Microsoft Corp., Expressions (MDX), Microsoft TechNet, SQL Server 2005 Books Online (Sep. 2007), 3 pages.

OA Dated Jan. 5, 2009 for U.S. Appl. No. 11/116,924, 49 pages.

OA Dated Dec. 29, 2008 for U.S. Appl. No. 11/050,130, 29 pages.

OA Dated Jul. 1, 2008 for U.S. Appl. No. 11/050,130, 22 pages.

Youness, "Using NDX and ADOMD to Access Microsoft OLAP Data" dated 2000.

Office Action dated May 17, 2007 cited in U.S. Appl. No. 11/050,130.

Office Action dated Nov. 1, 2007 cited in U.S. Appl. No. 11/050,130.

Office Action dated Oct. 1, 2009 cited in U.S. Appl. No. 11/050,130.

Office Action dated Sep. 4, 2007 cited in U.S. Appl. No. 11/116,924.

Office Action dated Mar. 5, 2008 cited in U.S. Appl. No. 11/116,924.

Office Action dated Dec. 8, 2009 cited in U.S. Appl. No. 11/116,924.

* cited by examiner

DATABASE GENERATION SYSTEMS AND METHODS

CROSS-REFERENCE TO RELATED APPLICATIONS

This application claims the benefit of U.S. Provisional Application Ser. No. 60/586,541, filed Jul. 9, 2004, entitled "Systems and Methods to Analyze Database Data," the entirety of which is incorporated herein by reference.

TECHNICAL FIELD

The subject invention relates generally to databases and more particularly toward data warehouse systems.

BACKGROUND

Data warehousing and online analytical processing (OLAP) are widespread technologies employed to support business decisions and data analysis. A data warehouse is a nonvolatile repository for an enormous volume of organizational or enterprise information (e.g., 100 MB-TB). These data warehouses are populated at regular intervals with data from one or more heterogeneous data sources, for example from multiple transactional systems. This aggregation of data provides a consolidated view of an organization from which valuable information can be derived. Though the sheer volume can be overwhelming, the organization of data can help ensure timely retrieval of useful information.

Data warehouse data is often stored in accordance with a multidimensional database model. Conceptually in multidimensional database systems, data is represented as cubes with a plurality of dimensions and measures, rather than relational tables with rows and columns. A cube includes groups of data such as three of more dimensions and one or more measures. Dimensions are a cube attribute that contains data of a similar type. Each dimension has a hierarchy of levels or categories of aggregated data. Accordingly, data can be view at different levels of detail. Measures represent real values, which are to be analyzed. The multidimensional model is optimized to deal with large amounts of data. In particular, it allows users execute complex queries on a data cube. OLAP is almost synonymous with multidimensional databases.

OLAP is a key element in a data warehouse system. OLAP describes category of technologies or tools utilized to retrieve data from a data warehouse. These tools can extract and present multidimensional data from different points of view to assist and support managers and other individuals examining and analyzing data. The multidimensional data model is advantageous with respect to OLAP as it allows users to easily formulate complex queries, and filter or slice data into meaningful subsets, among other things. There are two basic types of OLAP architectures MOLAP and ROLAP. MOLAP (Multidimensional OLAP) utilizes a true multidimensional database to store data. ROLAP (Relational OLAP) utilizes a relational database to store data but is mapped so that an OLAP tool sees the data as multidimensional. Thus, multidimensional databases can and are often generated from relational databases.

Conventionally, design of a multidimensional database requires a number of steps. First, the purpose and scope of the system must be clearly defined. This requires acquiring input from the users, analysts, and executives that will be utilizing the system. Next, tables are designed, for example one table per subject. Then, the records and fields are designed and specified and relationships are determined amongst the tables. The relational database can then be populated with data. Thereafter, multidimensional structures such as cubes and dimensions can be developed and mapped to the appropriate relational database tables. Alternatively, multidimensional structures can be simply mapped to an existing relational database.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described the subject invention concerns development and design of a multidimensional database system. Disclosed herein are a myriad of systems, methods, techniques and tools for developing multidimensional or OLAP objects such as cubes and dimensions in the absence of any underlying relational database. Once the multidimensional objects are defined, the underlying relational database can be generated as well as any components necessary for loading the database with data from one or more data sources or temporary repositories. This can be referred to as a top-down approach. Such a top-down approach is advantageous in that it allows for quick prototyping of data warehouse applications, allows an analyst to focus their efforts on the end user model (viz., multidimensional representation), and avoids the need to understand how to build a relational database, among other things.

Furthermore and in accordance with an aspect of the invention, an iterative approach to data warehouse development and support systems for such approach are provided. In particular, a user or developer can modify a previous multidimensional model and regenerate the supporting relational schema and database. Moreover, a user can modify directly or indirectly the relational schema generated from one or more multidimensional objects, and the modifications to the schema can be preserved upon subsequent schema regeneration. Thus, a user can modify the multidimensional model and the relational schema alone or together and a new schema can be generated preserving and reflecting the set of changes. This aspect of the subject invention essentially allows users or developers to work in both directions creating some multidimensional objects bottom-up by creating them over existing tables and others top-down by creating them in the absence of any relational objects and subsequently generating such objects.

In accordance with an aspect of the invention, a database generation system is disclosed. The database system can include a developer component to facilitate direct definition of multidimensional objects such as cubes and dimensions. The system can also include a schema generation component that receives the multidimensional object definitions and produces at least one relational schema. The relational schema can then be applied to a database. Load components can be employed to load the database from one or more data sources or temporary repositories.

In accordance with still another aspect of the invention, a modification system is disclosed including one or more of a database schema modification component and a multidimensional modification component as well as schema and database generation components. Furthermore, a monitor component can be included to track changes to database schema and/or multidimensional objects. The modification components can be employed to modify either or both of the database relational schema and the multidimensional objects. A new modified schema can then be produced and populated. The monitor component can facilitate preservation of changes by providing alteration information to one or more of the schema generation component and the database generation component.

In accordance with another aspect of the invention, a database generation system or component can include one or more load components. The load components can aid in loading the database with data. Moreover, the load components can provide a myriad of different functionalities relating to the loading process including but not limited to handling errors and slowly changing dimensions, and generation of a time table, a log of actions, and flat files.

In accordance with yet another aspect of the invention, a system provided to facilitate definition of multidimensional objects and population of a database related thereto. The system can include an interface component and a generation system, where the interface component retrieves data from a user and provides it to the generation system, which automatically generates a schema and populates a database. In accordance with a particular aspect of the invention, the interface component can employ a plurality of graphical user interfaces and/or dialog boxes. Additionally or alternatively, the interface component can employ or correspond to a wizard that collects information in a step-by-step manner regarding definition of one or more multidimensional objects and desired options for generating a database.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component," "sub-component," and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" (or alternatively, "computer program product") as used herein is intended to encompass a computer program accessible from any computer-readable device, or media. For example, computer readable media can include but are not limited to magnetic storage devices (e.g., hard disk, floppy disk, magnetic strips...), optical disks (e.g., compact disk (CD), digital versatile disk (DVD)..., smart cards, and flash memory devices (e.g., card, stick). Of course, those skilled in the art will recognize many modifications may be made to this configuration without departing from the scope or spirit of the subject invention.

Figure 1:
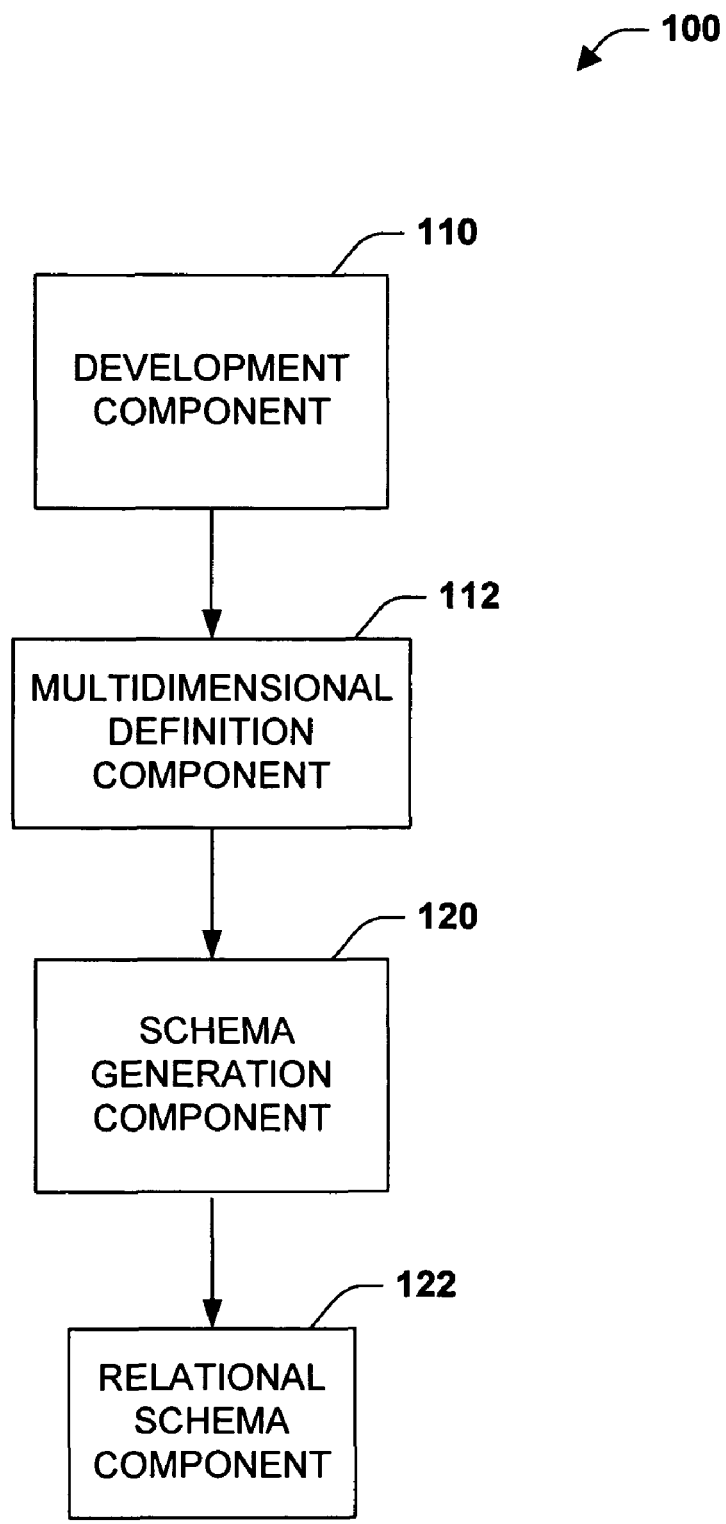
FIG. 1 is a block diagram of a system for building multi-dimensional databases in accordance with an aspect of the subject invention.

Artificial intelligence based systems (e.g., explicitly and/or implicitly trained classifiers) can be employed in connection with performing inference and/or probabilistic determinations and/or statistical-based determinations as in accordance with one or more aspects of the subject invention as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines...) can be employed in connection with performing automatic and/or inferred action in connection with the subject invention Turning initially to FIG. 1, a multidimensional database development system 100 is illustrated in accordance with an aspect of the present invention. A multidimensional database employs a data model for organizing data that is optimized for data warehouses, online analytic processing (OLAP), and data mining applications. Conceptually, data in a multidimensional database is stored in cubes defined via multiple dimensions (i.e., three or more) and measures rather than tables, rows, and columns in a relational database. Dimensions are cube attributes that describe a similar set of members upon which a user may wish to base analysis. Furthermore, dimension categories or levels can be arranged hierarchically. For example, a time dimension may include levels for year, month, day, hour, etc. A geography dimension may include levels for country, state, city and the like. Measures are the values, usually numeric, that are aggregated and analyzed. In one particular implementation, dimension categories or levels can describe data in a fact table while measures identify a set of values for a column(s) in the fact table. System 100 can include a development component 110 and a schema generation component 120.

Development component 110 provides a mechanism to define a multidimensional schema or model. The development component 110 facilitates top-down design and rapid initial prototyping of a multidimensional database. In particular, the component 110 can be a tool to allow multidimensional objects such as cubes, dimensions, and properties thereof to be defined or specified. The component 110 can receive input from an entity such as user and based at least in part on such input generate a multidimensional definition component 112. The definition component 112 can include a set of multidimensional objects such as one or more cubes and dimensions, among other things. In accordance with an aspect of the invention, development component 110 can correspond to a wizard soliciting and receiving information necessary for producing multidimensional or cube definitions. Additionally or alternatively, the development component can provide a mechanism for manual specification of multidimensional objects and/or use of templates.

Still further yet, development component 110 can provide a mechanism for specifying how a database is to be populated from one or more sources. As described in a later section, such information can then be employed to generate components that populate a database accordingly. Additionally, according to an aspect of the invention the load information can be provided together with the multidimensional definitions in multidimensional definition component 112.

Schema generation component 120 produces a relational schema or relational schema component 122. Generation component 120 receives as input multidimensional object or cube definitions. More specifically, the generation component 120 receives a multidimensional definition component 112. In one instance, such component can be generated by a development component 110. Alternatively, the component 112 can be predefined and simply retrieved from a storage medium. Schema generation component 120 analyzes the multidimensional definitions and produces a relational schema 122 to support such definitions. The relational schema 122 can include collection of related database objects, such as a set of tables, associated with particular multidimensional structures. These set of tables or database objects function to allow multidimensional structures such as cube to retrieve source data from a database. For example, a fact table can be created as the central table for each cube. Other tables can be specified or created for each dimension. The fact table can be specified to include a column for each dimension and each measure, inter alia, where the column for each dimension points to a respective dimension table and the cube's measures are derived from other columns. This is an example of a star database model, however other database models or schemas can be employed including but not limited to a snowflake data model.

Figure 2:
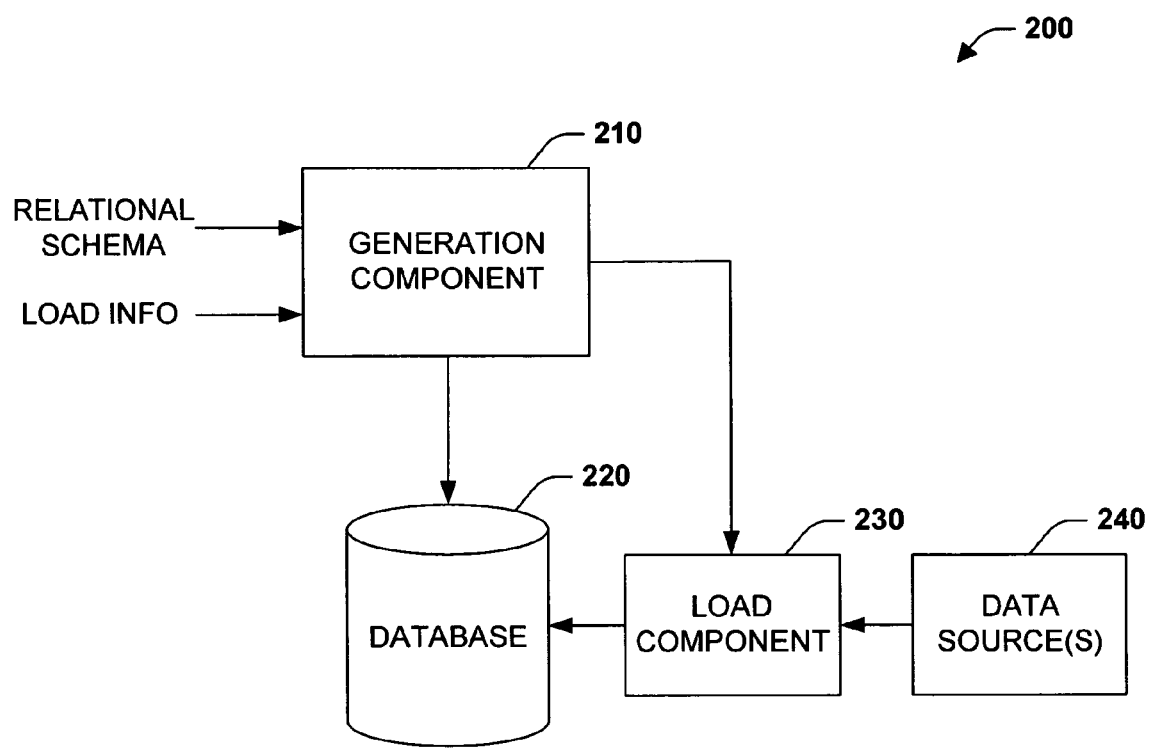
FIG. 2 is a block diagram of a database generation system in accordance with an aspect of the subject invention.

FIG. 2 illustrates a database generation system 200 in accordance with an aspect of the invention. System 200 includes a database generation component 210. Generation component 210 receives a database schema and produces a database 220 such as subject area database. In particular, generation component 210 can receive a relational schema, for example generated in response to specified multidimensional structures or objects. Upon receipt of a relational schema, the database generation component 210 can generate a database and apply the schema to the database 220. The database 220 can therefore store a set of tables corresponding to defined cubes and dimensions. Generation component 210 can also receive load information regarding how a database should be loaded. From this load information, generation component 210 can produce one or more load components 230. A load component 230 can load or facilitate population of the database 220 from one or more data sources 240. Accordingly, the load component can retrieve data from data source(s) 240 as well as store such data to the database 220 in accordance with the database schema. Specifically, the tables can be loaded with data such that multidimensional structures or objects can access the data via the relational schema. For example, load component can store data to a fact table and one or more dimension tables. Furthermore, it should be appreciated that user or entity input can be received by the database generation component 210 to specify specific options or functionality to be associated with the load component 230. Additionally, load components can be saved for later use.

It should be appreciated that while the subject invention has been described with a separation between the schema generation and the generation of a database and load components, the invention is not so limited. In fact, in accordance with an alternative aspect of the invention, generation component 210 could receive a multidimensional definition component 112 (FIG. 1) including multidimensional definitions as well as load information. From the multidimensional definition component 112, generation component 210 can generate the relational schema as well as a database and apply the schema to the database during construction thereof. Furthermore, the generation component can utilize load information from the definition component 112, for instance, to generate a load component 230.

Figure 3:
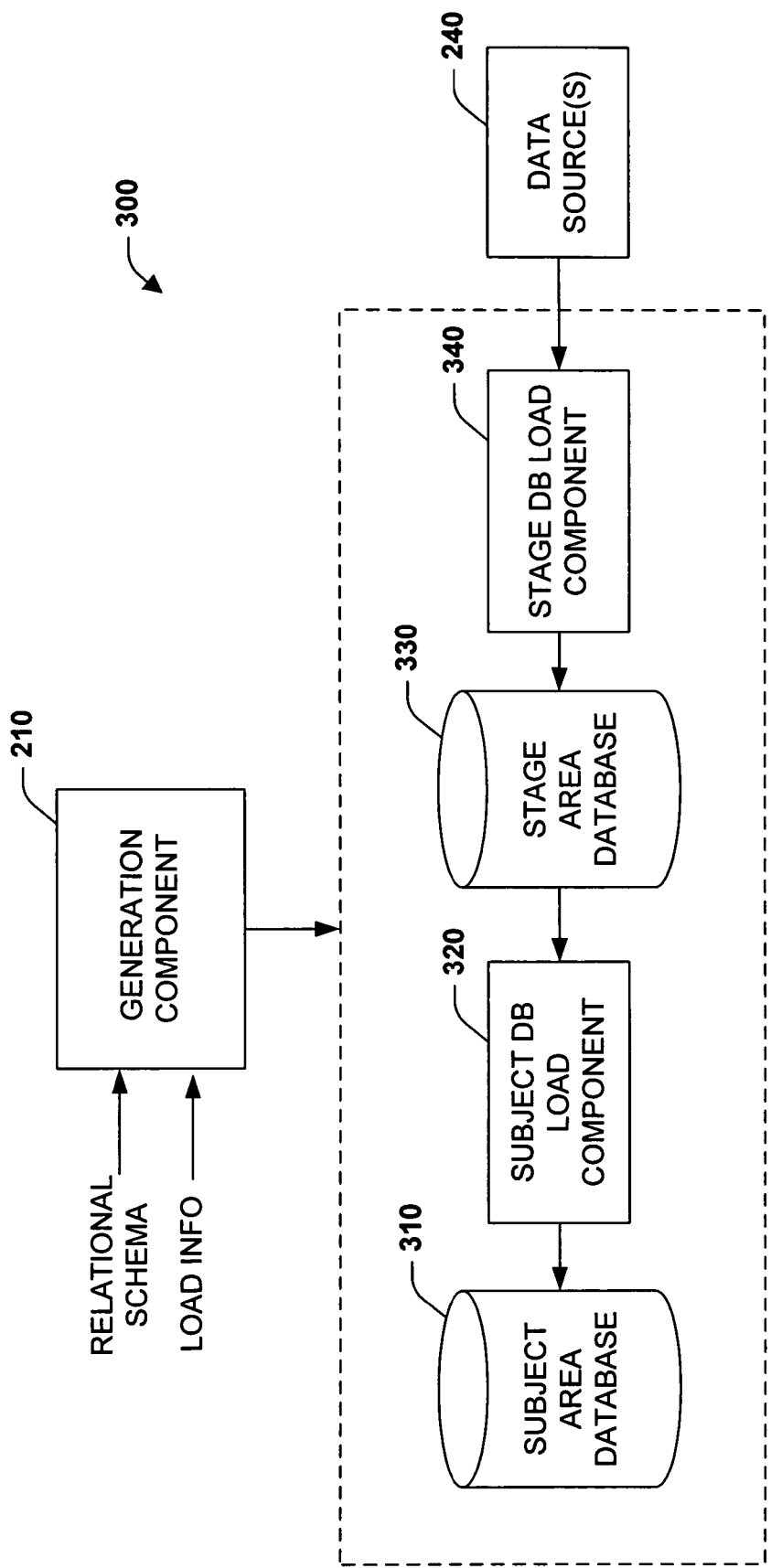
FIG. 3 is a block diagram of a database generation system in accordance with an aspect of the subject invention.

FIG. 3 depicts another database generation system 300 in accordance with an aspect of the subject invention. System 300 includes a generation component 210 that receives a relational schema, load information, as well as possibly some input from users or another entity and generates subject area database 310, subject area load component 320, stage area database 330, and stage area load component 340 to facilitate population of a relational database according to a particular schema. Subject area database 310 is the database that stores data for utilization by multidimensional objects or structures directly or indirectly, for example through a data source view. Accordingly, generation component 210 generates the database 310 and applies a relational schema to it. The schema can be a relational schema that is either newly generated or previously saved. Stage area database 330 can also be generated by generation component 210. The stage area database 330 can also be a relational database that temporarily stores data (e.g., new inserts, updates and deletes) before they are loaded to the subject matter database.

To enable transfer of data between a data source(s) 240, a stage area database 330 and a subject area database 310, the generation component 210 can provide several load components or data transformation service packages. In particular, stage area database load component 340 and subject area database load component 320 can be generated. The stage area load component 340, inter alia, loads data from data sources 240, such as flat files, into the stage area database 330. It can also generate a time table for population of a time dimension. The subject area database load component 320 loads data from the stage area database 330 to the subject area database 310. More specifically, load component 310 retrieves data from the stage area database 330 and loads fact tables and dimension tables, as well as any other tables associated therewith. It should be appreciated that one or both of load components 320 and 340 can also provide other functionality or data transformations including but not limited to error checking and slowly changing dimension functionality. For instance, load components can verify referential integrity.

By way of example, if there was a sales table and a product table, the components error checking could make sure each sale was for a product in the product table and not null or a non-existing product.

Similar to system 200 of FIG. 2, it should be appreciated that generation component 210 can alternatively receive a multidimensional definition component 112 (FIG. 1) providing multidimensional definitions as well as load information. From the multidimensional definitions, the generation component 210 could generate schemas for the subject area and stage area databases and generate those databases with the respective schemas. Furthermore, the generation component can generate the subject and stage database load components from the load information provided by the multidimensional definition component 112.

Figure 4:
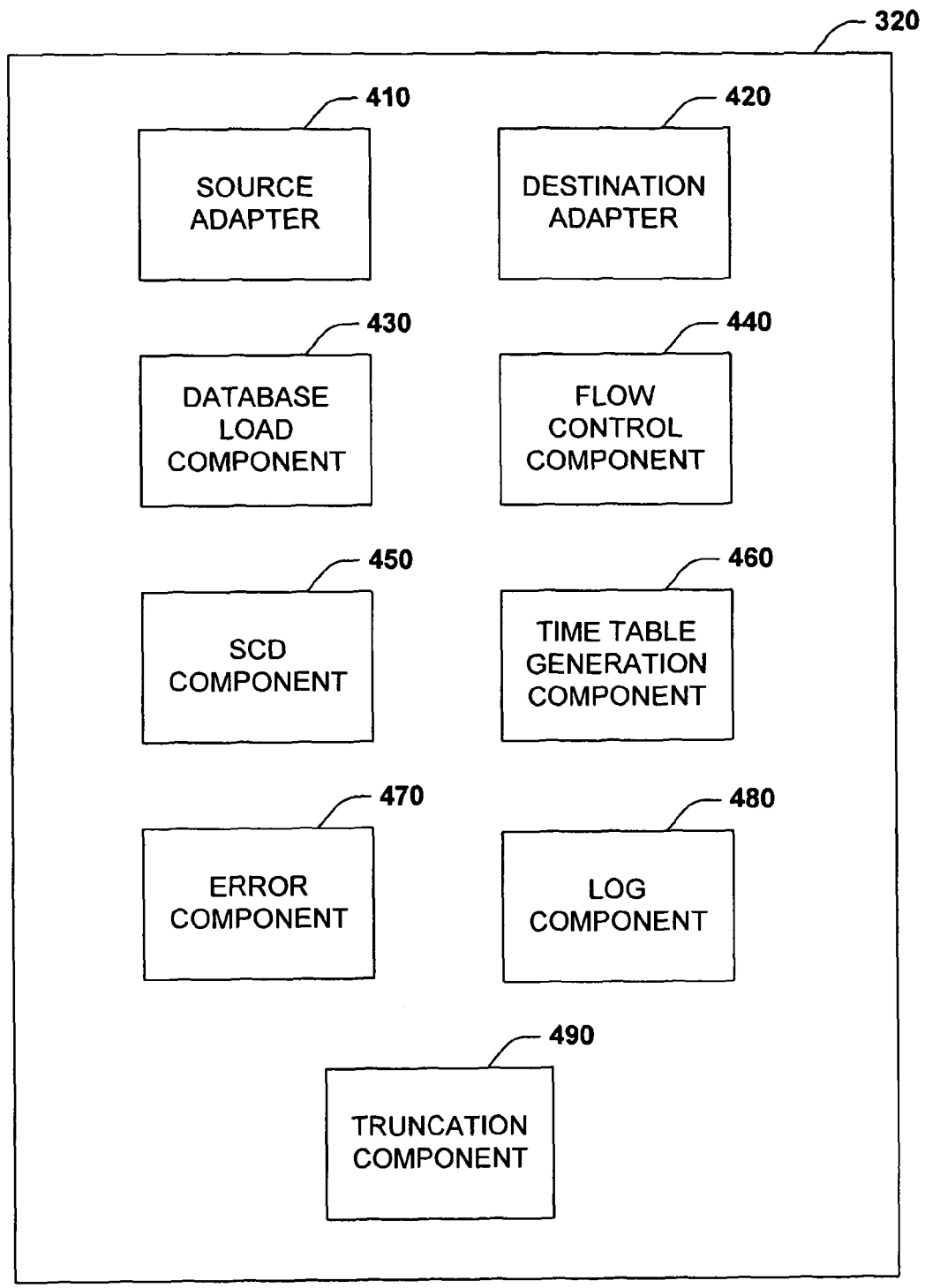
FIG. 4 is a block diagram of a load component in accordance with an aspect of the subject invention.

Turning to FIG. 4, a database load component 320 is depicted in accordance with an aspect of the subject invention. As described supra, database load component 320 can be employed to load data from the staging area database to the subject area database, for example. Many different subcomponents (also referred to herein as packages) can be employed in conjunction with load component 320 to facilitate and add value to the load process. First, load component 320 can include source and destination adapters 410 and 420. These adapters, which can be components as defined herein, enable a connection to be established to the subject area database and the staging area database. Of course, load component 320 can include a sub-component database load component 430 that receives data from the source and loads it to the destination. For example, database load component can populate relational schema tables. Furthermore, database load component 430 can alter or transform data prior to storing or loading it to the destination. For instance, denormalized data structures can be transformed into normalized data structures. Flow control component 440 can be employed by the database load component 430 to analyze data in a source and determine the proper loading sequence. Slowly changing dimension (SCD) component 450 can automate the handling of dimensions as well as other objects or attributes likely to change, for example customer address, and specify and facilitate a manner of dealing with such attributes, perhaps based on user input or by default. For example, this can involve overwriting a changed value with a new value, flagging an attribute as changed and adding a new row, for instance, with the new or current value, or making a change to the structure housing the attribute to support old and new values such as by adding another column to a row. Time table generation component 460 can be employed to facilitate generation and storage of a time table to support multidimensional queries over a time dimension.

Error component 470 can analyze source data and/or monitor the load process to detect errors. For example, error component 470 can ensure reference integrity, for instance by analyzing sales and product tables and detecting whether any of the sales fail to map to a product in the product table. Once an error is detected, the loading process can be halted and an error message presented. Additionally or alternatively, the error correction component can correct or suggest corrections for the error by inferring the cause thereof. In accordance, with one aspect of the invention this can be accomplished utilizing or more artificial intelligence techniques including but not limited to expert systems, Bayesian and neural networks or classifiers. Furthermore, it should be appreciated that error component can include validation of denormalized data. A normalized structure is one in which data is held in separate tables, for example a table for customer names and table for cities and states associated therewith. Accordingly, based on the structure, it is almost certain that each city will correspond to a single state. However, denormalized data is data held in a single table that is effectively the customer and city tables joined together. With denormalized data, there is a possibility of introducing logical errors as a city associated with a customer could be entered with different states such as Seattle, Wash. and Seattle, Calif. Error handling component 470 can thus verify or validate that the data is correct and possibly make corrections.

Load component 320 can also include other components. For example, load component 320 can include a log component 480 that generates and saves a log of load process operations, for instance for later examination or analysis. Additionally, truncation component 490 can remove all data from the data source. For example, upon complete retrieval or during retrieval of data from a staging area database the load component can remove all data from the database. This could be accomplished, for instance, by execution of a SQL truncation command on the staging area database tables.

It should be noted that load component 320 is not limited to the components or sub-components mentioned and/or described above. Those components are merely exemplary and are not to be limiting on the scope of the invention. Load component 320 can also include other sub-components not specifically mentioned or described and/or any subset or superset of those components previously described and not specifically mentioned. By way of example, the load component 320 could also include components for management of partitions, adding details to records to provide information as to the batch within which a record was loaded, and provide standard treatment for changes to dimensions records including assignment of surrogate keys, among other things.

Figure 5:
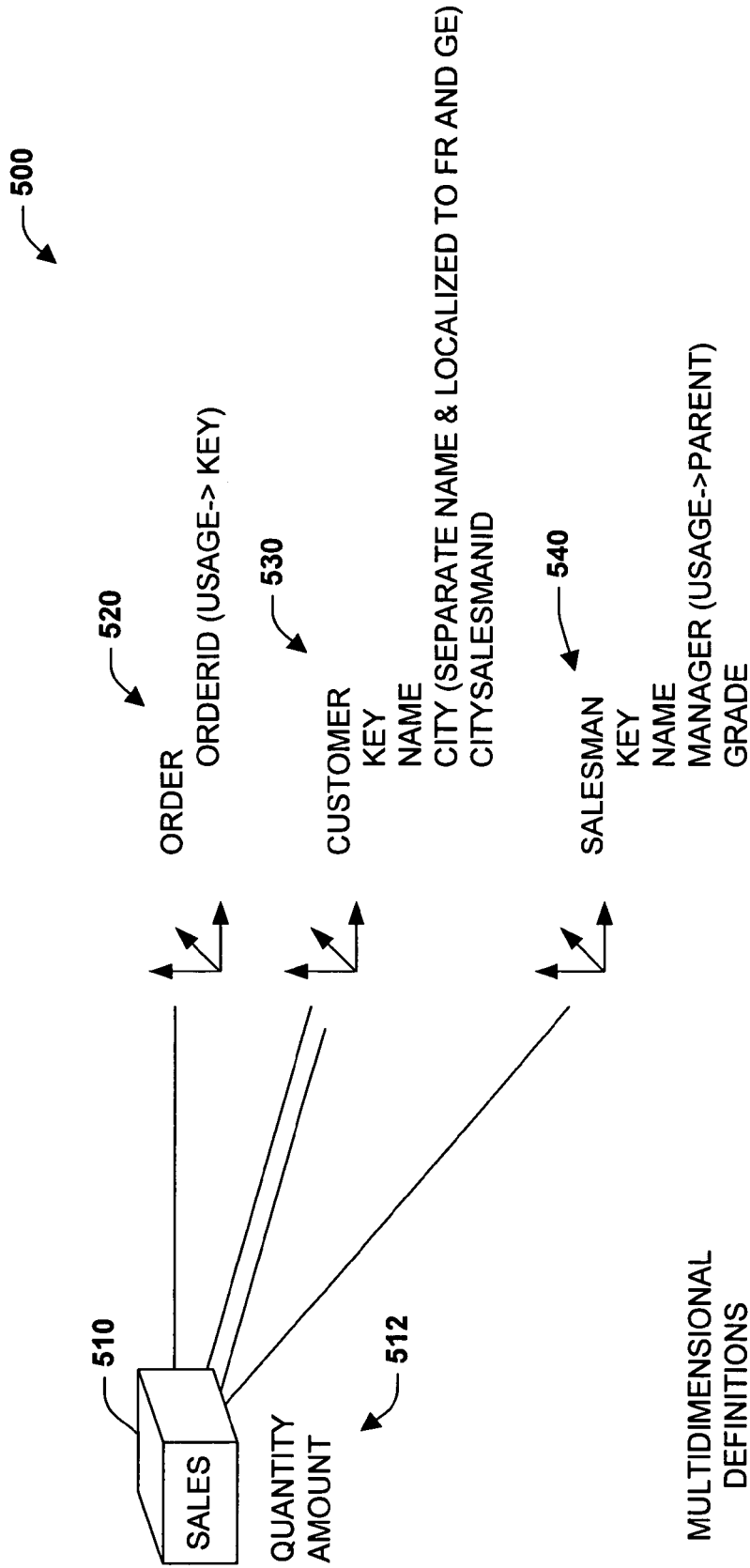
FIG. 5 is an exemplary diagram of a cube definition in accordance with an aspect of the subject invention.

FIG. 5 depicts an exemplary multidimensional definition 500 in accordance with an aspect of the subject invention. In particular, definition 500 defines a cube and three dimensions. As illustrated, a sales cube 510 is defined including two measures 512, namely quantity and amount. Thus, the cube 510 can store sales information including the quantity sold and the price for which the items sold. Also defined are three cube dimensions 520, 530, and 540. Dimension 520 corresponds to orders and includes an order identifier that can be used as a key. Dimension 530 is a customer dimension and includes a key, a name, a city, and a city salesman identifier. Dimension 540 corresponds to a salesman dimension, which is accessed indirectly via Customer. Dimension 540 includes dimension elements or levels key, name, manager, and grade.

Figure 6A:
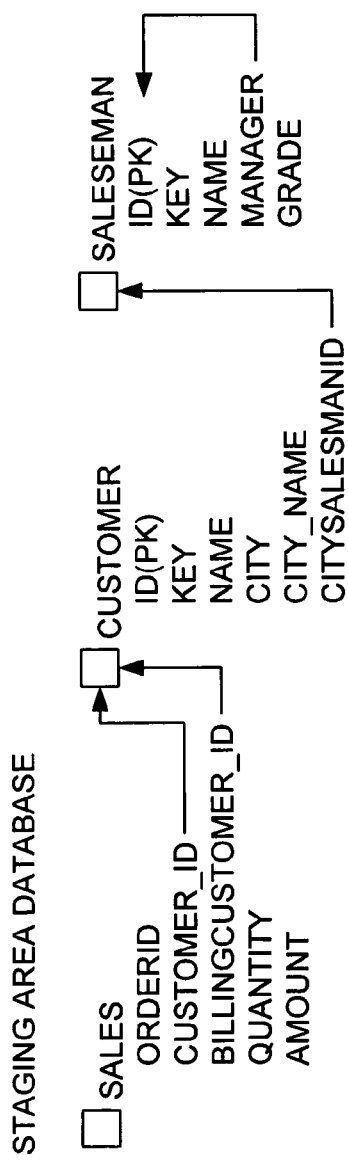
FIG. 6a is an exemplary diagram of a staging area database schema in accordance with an aspect of the subject invention.
Figure 6B:
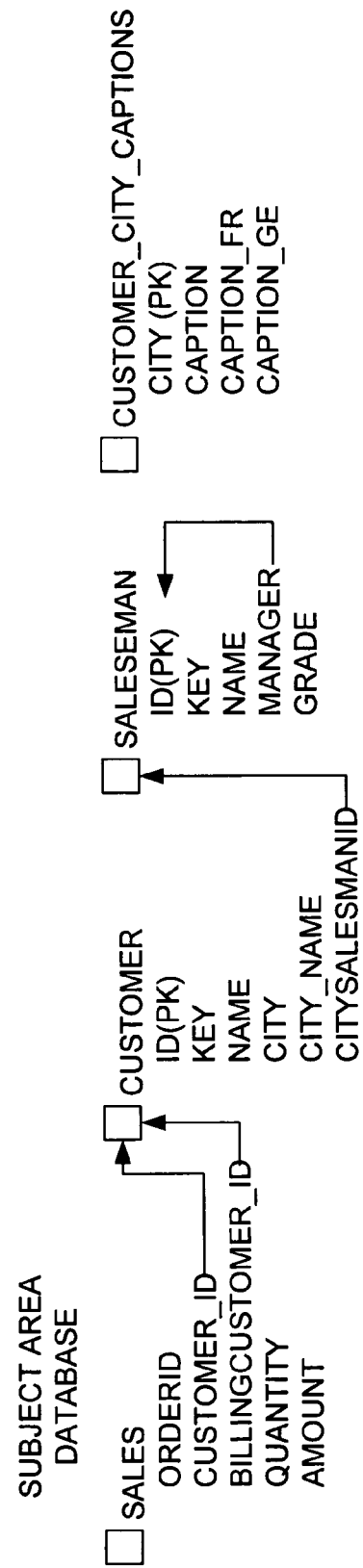
FIG. 6b is an exemplary diagram of a subject area database schema in accordance with an aspect of the subject invention.

FIGS. 6a and 6b illustrate the database schemas for two databases in accordance with the exemplary cube definition 500 (FIG. 5). FIG. 6a shows the structure for a stage area or staging area database, while FIG. 6b illustrates the schema for the subject area database. As illustrated, tables are specified for sales, customer, salesman, and in the subject area database, customer city captions. The sales table has columns for order id, customer id, billing customer id, and measures quantity and amount. The customer table includes columns for id (primary key), key, name, city, city name, and city salesman id. The salesman table includes the primary key id, key, name, manager, and grade. The lines between tables indicate the relationship between tables and table elements. For example, customer id and billing customer id in the sales table both reference the customer table while city salesman id in the customer table references the salesman table. The staging area database schema comprises the main tables, while the subject area database schema comprises the complete set of tables including in this instance an additional table for customer city captions. As previously described, the staging area database stores data temporarily prior to being transferred to the subject area database, which can be utilized to satisfy queries, among other things.

Figure 7:
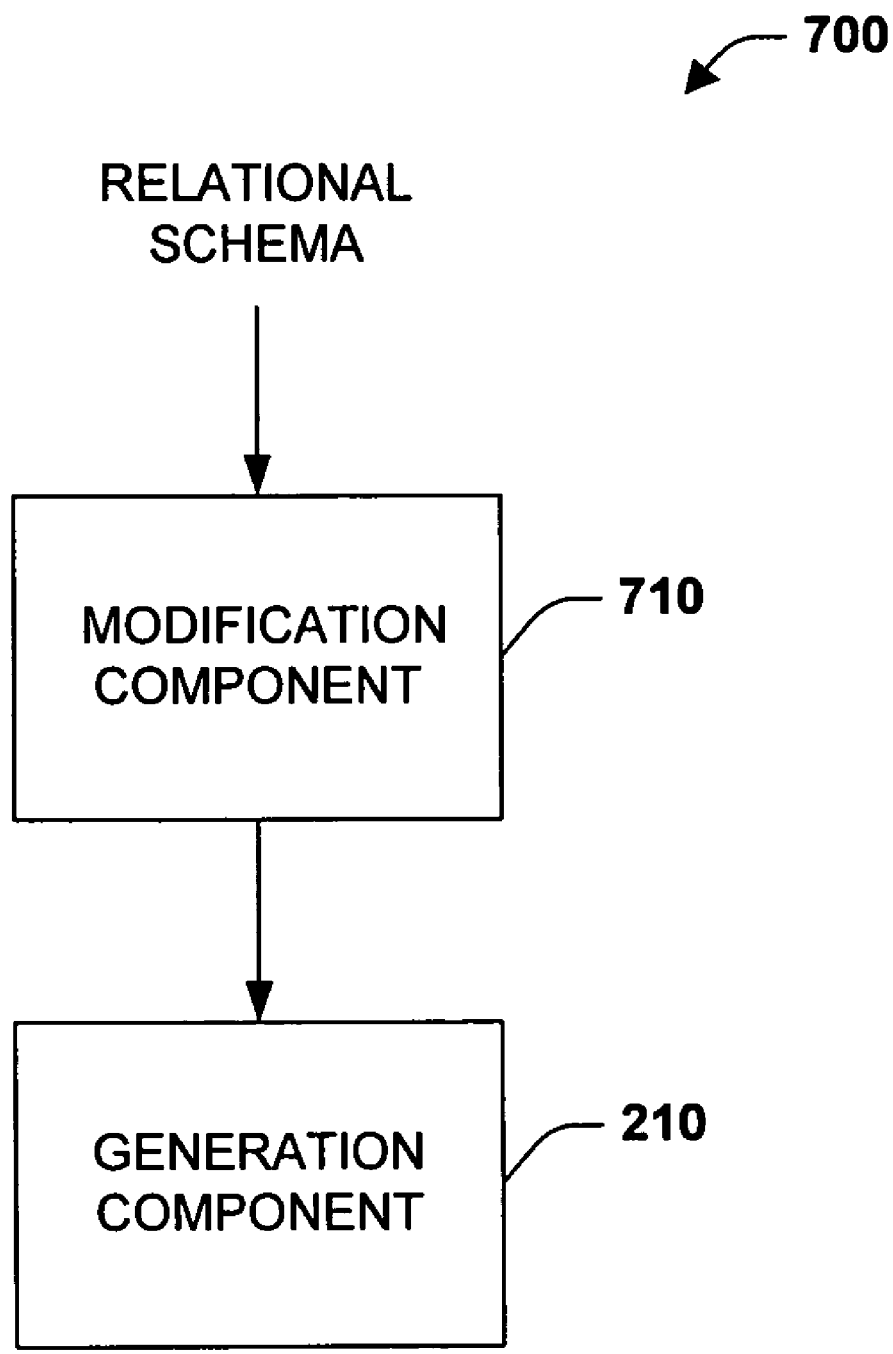
FIG. 7 is a block diagram of a modification system in accordance with an aspect of the subject invention.

FIG. 7 depicts a system 700 for schema modification in accordance with an aspect of the subject invention. System 700 includes a schema modification component 710 and generation component 210. The schema modification component 710 receives a relational schema. The schema can be received after initial generation, for example after an entity specifies cubes and dimensions and a schema is generated to support such multidimensional structures. Upon receipt of the schema, modification component 710 facilitates modification of the schema. For example, a user can interact with modification component 710 to alter the schema including but not limited to adding, deleting or otherwise modifying tables, columns, and rows and bind such alterations to multidimensional structures such as cubes and dimensions. This modified schema can then be passed to generation component 210 which can produce a database and apply the modified schema thereto. Subsequently, the generation component 210 can aid in populating the produced database from one or more heterogeneous data sources. Upon population, a multidimensional database model can be executed utilizing the produced relational database to retrieve data.

Although modification component 710 is illustrated and described with respect to modification of a schema prior to database generation, modification component 710 can also be employed to modify a schema after it is applied to a database. Modification component 710 can provide a means and mechanism for directly altering a database schema and/or a data source view. In this manner, a user can employ modification component 710 at any time to alter a database schema.

Figure 8:
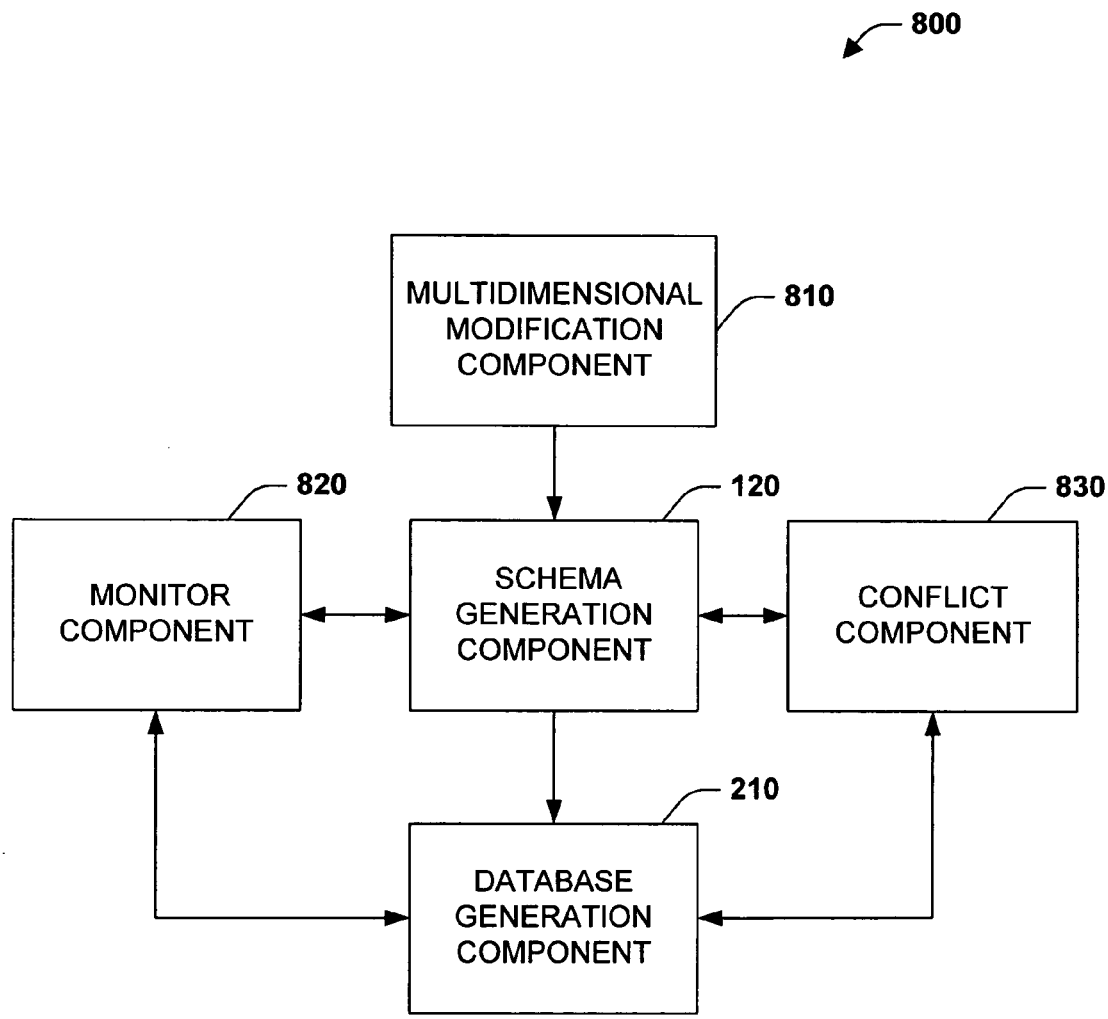
FIG. 8 is a block diagram of a modification system in accordance with an aspect of the subject invention.

FIG. 8 depicts a modification system 800 for modifying multidimensional elements in accordance with an aspect of the subject invention. System 800 includes a multidimensional modification component 810, schema generation component 120, monitor component 820, and generation component 210. Multidimensional modification component 810 enables alteration of multidimensional definitions (e.g., cube with multiple dimensions). Accordingly, modification component 810 is communicatively coupled to receive and/or retrieve a multidimensional model or schema defining cubes and dimension, among other things. Furthermore, the modification component 810 can receive user input that specifies alterations (e.g., additions, deletions, amendments . . . ). For example, a user could specify a new dimension on a cube. Modification component 810 could be employed in conjunction with an editor, a graphical user interface, an integrated design system or environment, and a wizard, inter alia. Upon receipt and/or specification of multidimensional definition alterations, a new modified schema can be generated to support the definitions.

Schema generation component 120 provides a mechanism to produce a modified schema. In particular, schema generation component 120 can receive or retrieve multidimensional definitions and generate a relational schema to support the defined structures. Furthermore, schema generation component 120 can receive data concerning changes or alterations that have been made to relational schema at an earlier time that are to be preserved. For example, system 700 (FIG. 7) could have been employed by a user to specify particular changes (e.g., new column, row, attribute . . . ) in the previous schema.

Monitor component 820 provides information to the schema generation component 120 and database generation component 210 regarding changes made to the schema and/or data added to the database prior to modification of multidimensional definitions by way of multidimensional modification component 810, for instance. Monitor component 820 can acquire such information monitoring a relational database schema, data, and/or a data view associated therewith and saving entries or alterations thereto by an entity other than the schema generation component 120 and database generation component 210. Additionally or alternatively, monitor component 820 can retrieve such information from system logs identifying changes to the schema, view and/or database data. This alteration information can then be provided to one or more of the schema generation component 120 and the database generation component 210.

Schema generation component 120 receives multidimensional definitions and if available alteration information. Upon receipt thereof, the schema generation component 120 produces a relational database schema that supports the new multidimensional definitions and preserves previous changes to the schema.

Generation component 210 produces and/or populates at lease one database in accordance with a schema. In particular, generation component 210 produces and/or populates at least one database in accordance with the new modified schema. Furthermore, generation component can receive alteration information from monitor component 820 concerning particular data to be preserved or saved to the generated database. This information can be employed by the generation component 210 if all such alterations are not reflected in the newly generated schema.

Accordingly, system 800 provides support for iterative database generation for supporting multidimensional data structures such as cubes and dimensions. A user can specify and generate a relational schema supporting a multidimensional model in a top-down fashion. Utilizing system 700 (FIG. 7), the generated schema can be altered before and/or after database generation and population, for instance specifying new tables, columns, names or attributes. Subsequently, an entity can modify the multidimensional structure definitions and regenerate both the schema and the database, while at the same time preserving changes made to the schema, database, and or data. However, in certain instances alterations may be inconsistent such that the new changes to the multidimensional model and the old changes to the relational schema and/or data cannot coexist.

Conflict component 830 is a mechanism for dealing with inconsistent or mutually exclusive changes. Conflict component 830 can receive a signal and/or data from schema generation component 120 and/or generation component 210 if and when a conflict arises concerning changes to be made and changes to be preserved. According to one aspect of the invention, conflict component 830 can notify a designer of such a conflict and receive instructions from the user concerning how to proceed. For instance, a graphical user interface or pop-up box can be employed to notify the user of the conflict. The message could simply notify the user that if they proceed with generation particular previously entered data will be deleted or overwritten. The user could then simply click a continue button or icon to proceed or a back button or icon to make changes to the multidimensional definitions. Additionally and/or alternatively, if a user decides to proceed and data will be lost or overwritten, the conflict component 820 can save the change data that would otherwise be deleted and/or overwritten, for instance to allow a user to rollback changes at a future point in time.

Figure 9:
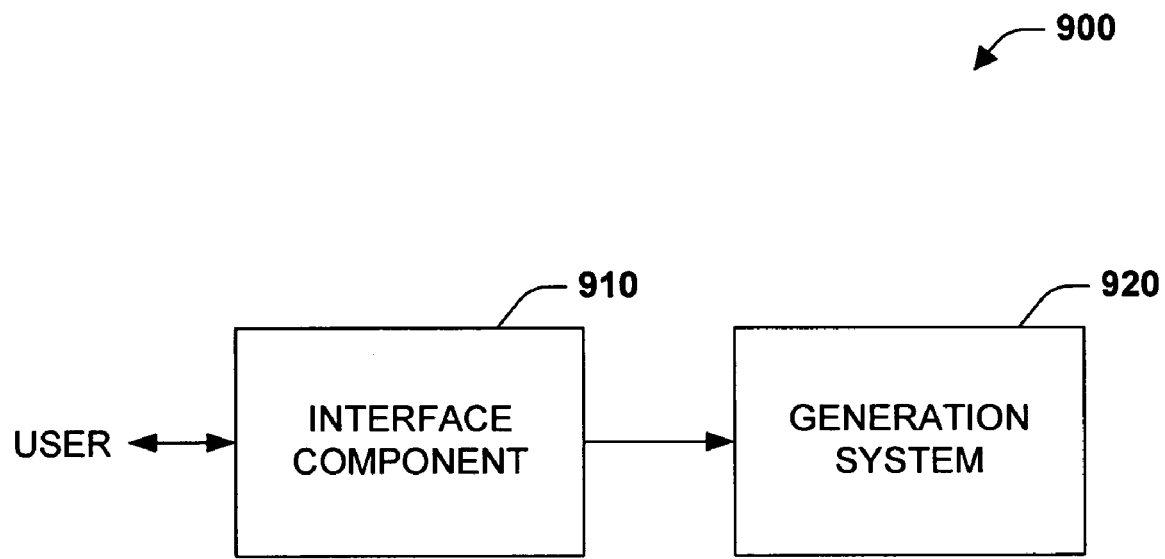
FIG. 9 is a block diagram of a database generation system in accordance with an aspect of the subject invention.

Turning to FIG. 9, a database generation system 900 is depicted in accordance with an aspect of the subject invention. Database generation system 900 can be employed to produce one or more relational databases that support a multidimensional database model. System 900 includes an interface component 910 and a generation system 920. Interface component 910 solicits information necessary for construction of a database, database schema, load components, and the like from a user. The interface component 910 can be a graphical user interface containing a plurality of graphical components that facilitate generation of a database and any other related components including but not limited to a buttons, text boxes, drop-down menus, tabs, hyperlinks, check boxes, and scroll bars. A user can then interact with the interface component utilizing input devices such as a keyboard and/or a pointing device (e.g., touch pad, touch screen, stylus, mouse, track ball . . . ). The interface component 910 can be a free form tool for use by a developer or a wizard that specifies a series of steps, wherein each step must be completed before a user is allowed to advance to the next step in the series. The generation system 920 receives and/or retrieves information from the interface component 910. Subsequently and/or concurrently therewith, the generator system 920 can produce one or more databases and related components in accordance with the data provided by the interface component 910. In particular, the generation system 920 can produce one or more of a subject area database, a staging area database and one or more load components to facilitate data retrieval and database population. It should be appreciated that generation system 920 can by adapted to perform any of the functionality described through out this specification. Furthermore, it is to be appreciated that generator system 920 can utilize adaptive artificial intelligence technologies (e.g., expert systems, Bayesian networks, neural networks . . . ) and inferences to further facilitate development of one or more databases and loading components.

According to an aspect of the subject invention, interface component 910 can be a wizard. A wizard is a user interface (e.g., GUI) that guides a developer through a sequence of steps, wherein each step should be completed before advancing to the next step in the series unless the step is optional, of course. FIGS. 10-18 illustrate exemplary wizard graphical user interfaces or dialog boxes that can be used to generate at least one relational database to support multidimensional queries. Each figure depicts GUI that includes a plurality of related images and interface objects or elements to facilitate guiding a user through a myriad of selection options. It should be noted, however, that these illustrations are provided by way of example and not limitation. As one of skill in the art can appreciate, there is a multitude of ways to arrange and present graphical user interfaces. The depicted GUIs illustrate only one such arrangement and are presented for purposes of clarity and understanding and not to limit the scope of the subject invention.

Figure 10:
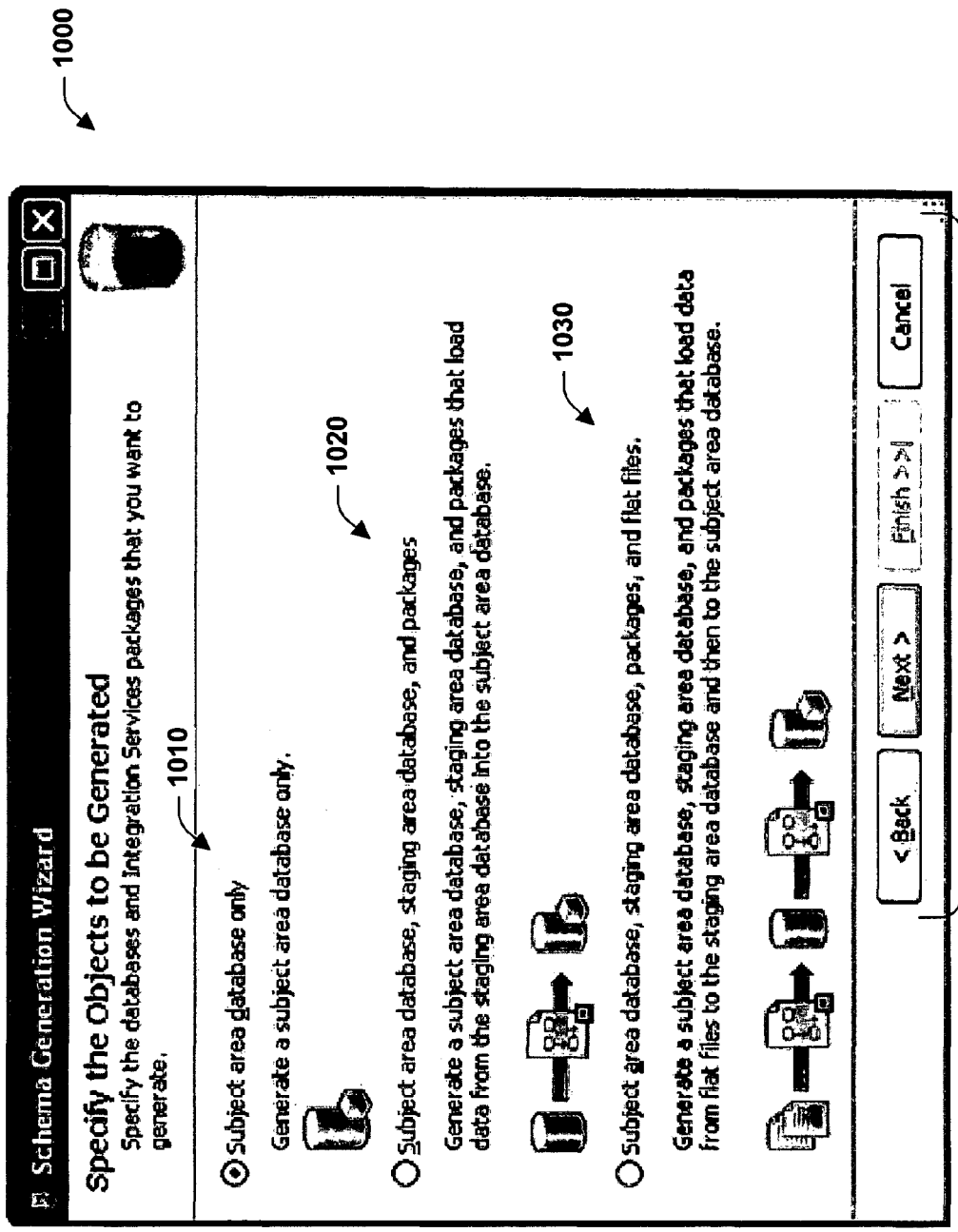
FIG. 10 is an exemplary graphical user interface in accordance with an aspect of the subject invention.

Turning first to FIG. 10, a graphical user interface 1000 is illustrated in accordance with an aspect of the subject invention. Interface component 1000 includes a myriad of different graphical components. Selectable radio buttons 1010, 1020, and 1030 provide a means and mechanism for selecting amongst three different options identifying objects to be generated. Selection of button 1010 indicates that the user only wants a subject area database to be generated. Selection of button 1020 means that the user wants both a subject area database and a staging area database to be generated as well as one or more load components (i.e., packages) for loading the subject area database from the staging area database. Button 1030 is an option that indicates that a user wishes that a subject area database, a staging area database, and one or more load components or packages be generated to load data from flat files to the staging area database and from the staging area database to the subject area database. GUI 1000 then provides navigational buttons 1040 for moving to the next step, going back a step, or canceling the process.

Figure 11:
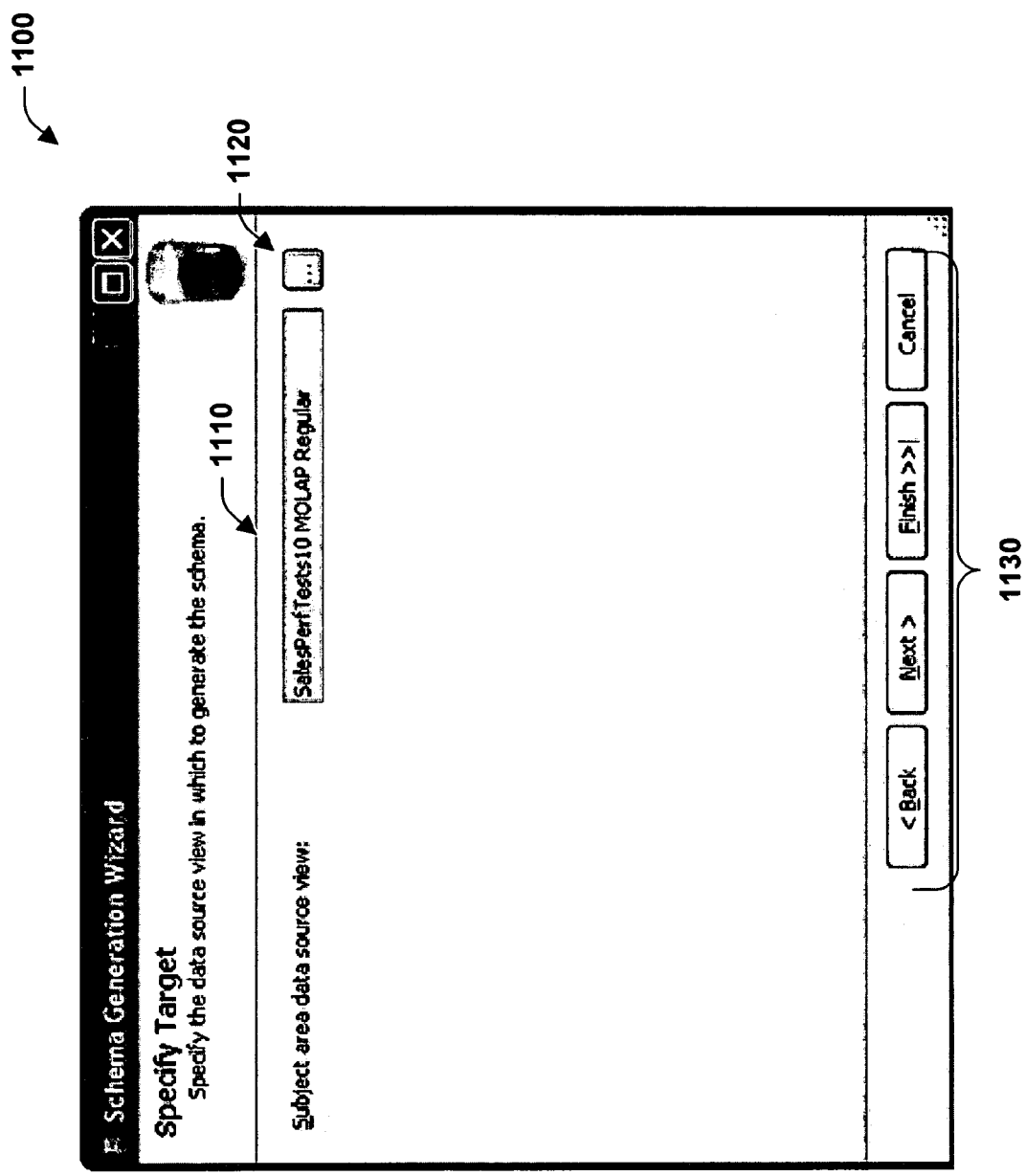
FIG. 11 is an exemplary graphical user interface in accordance with an aspect of the subject invention.

FIG. 11 illustrates a graphical user interface 1100 that can be utilized in accordance with an aspect of the subject invention. Interface 1100 allows a user to specify a data source view for a generated schema. Data source views can reduce large amounts of data down to a smaller subset that is of particular interest. By way of example, assume a database schema has ten-thousand tables and it is desirous to work with only five or six of these tables. In the most basic scenario where a single table is needed, the user will need to scroll through thousands of tables to find the required table. That is inefficient and agonizing for users. The data source view allows data to be cut down in to a smaller manageable subset that is of interest. In particular, a user can specify data source view definition in text box 1110. If a user is not able to specify the view definition or location thereof, they can activate button 1120, which will spawn a dialog box with further options.

Figure 12:
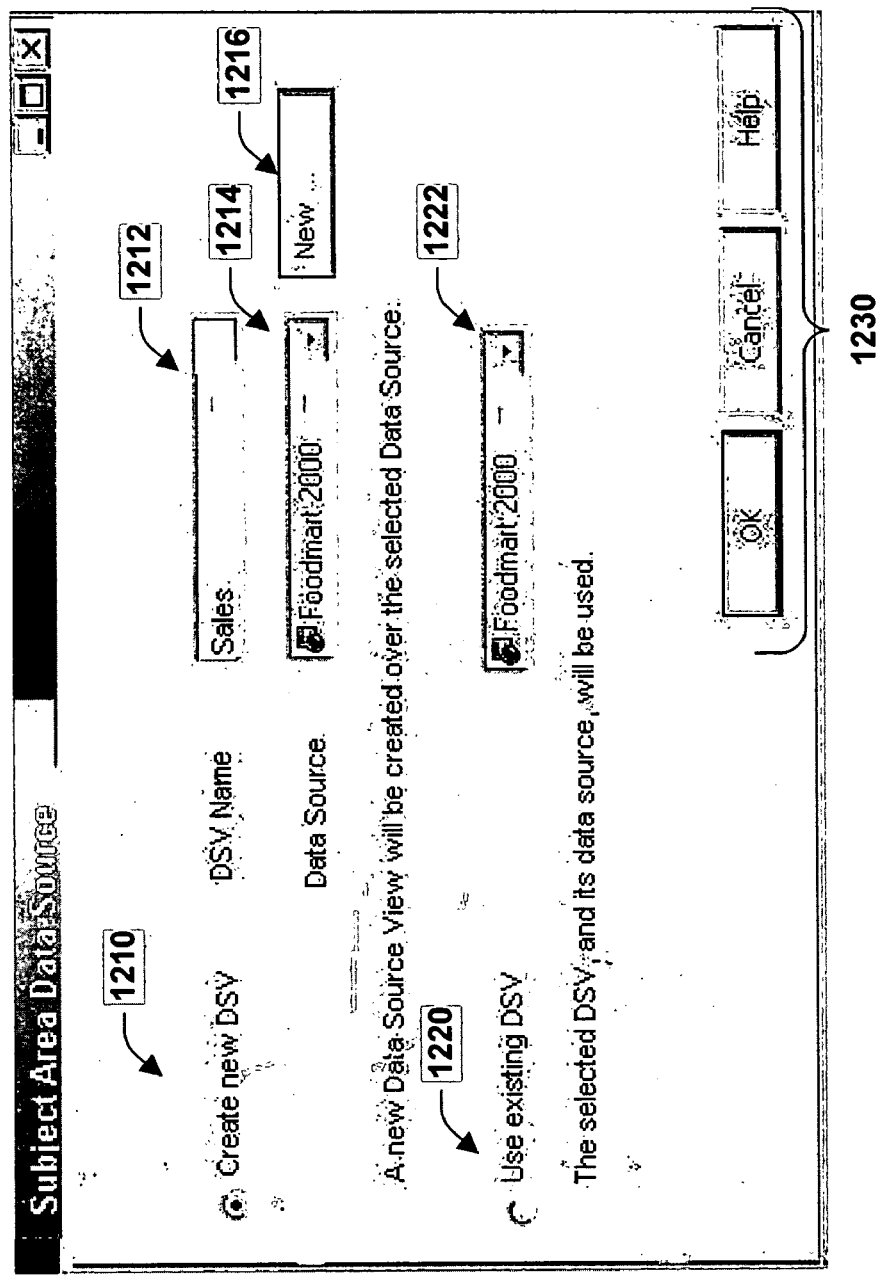
FIG. 12 is an exemplary dialog box in accordance with an aspect of the subject invention.

Turing briefly to FIG. 12, an exemplary dialog box 1200 is depicted in accordance with an aspect of the subject invention. Dialog box 1200 presents to options via buttons 1210 and 1220. Selection of button 1210 indicates that a user wishes to create a new data source view while selection of button 1220 indicates that a user wants to utilize an existing data source view. If a user wishes to create a new data source view than they can specify a name in text box 1212 and select a data source from drop-down menu 1214 or specify a new data source by selecting button 1216. If users want to select an existing data source view, they can select it utilizing drop down menu 1222. The dialog box also provides buttons 1230 to indicate that you have identified a data source view, that you wish to cancel such selection or you would like help.

Returning to FIG. 11, although not illustrated, it should be appreciated that a data source view can also be specified for a staging area database in a manner similar to that for the subject area database. Finally, GUI 1100 includes navigational buttons 1130. Here, the buttons next and back can be activated to proceed to the next step and go back to a previous step, respectively. Furthermore, the actions can be cancelled or the generation process finished by selecting one or those two buttons.

Figure 13:
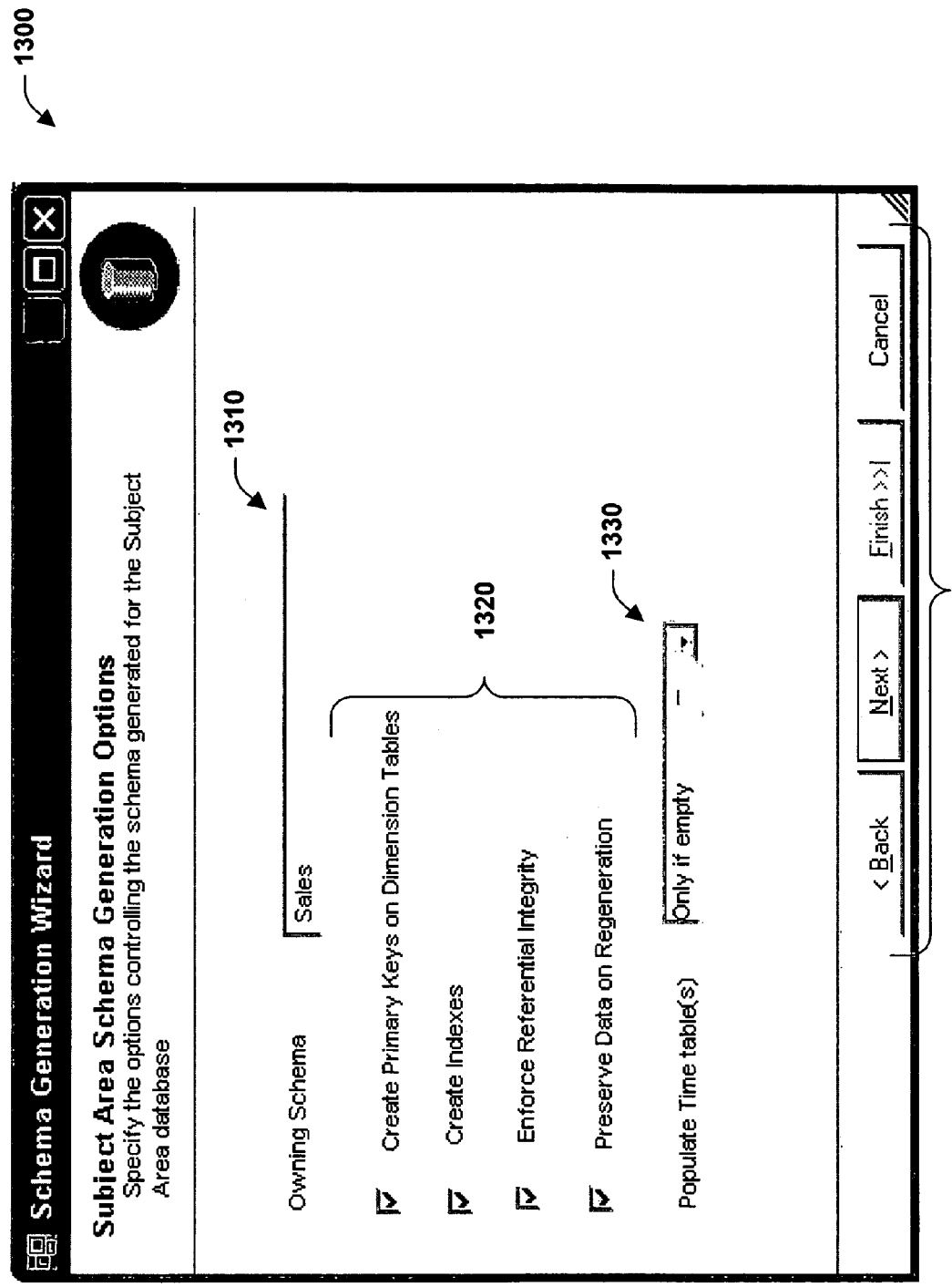
FIG. 13 is an exemplary graphical user interface in accordance with an aspect of the subject invention.

FIG. 13 depicts a graphical user interface 1300 in accordance with an aspect of the invention. GUI 1300 enables particular options to be specified with respect to generation of a subject area database schema. A text box 1310 is provided to enable specification of the owning schema. The owning schema is simply the name of the schema to be created. Here, the schema is named "Sales." GUI 1300 can also include numerous checkboxes 1320 to select options for the named schema. In this example, checkboxes correspond to the options create primary keys on dimension tables, create indexes, enforce referential integrity, and preserve data on regeneration. A drop-down menu 1330 is also provided to indicate options with respect to population of time tables. This option can be displayed when a staging area database is not to be created or the time table is not created by the staging area database or associated load component. The drop-down menu 1330 can include the selectable values "true," "false," and "Only if empty." GUI 1300 also includes navigational buttons 1340 including back, next, and cancel. These buttons can be employed to affect the flow of data and more particularly to go back to the previous GUI, proceed to the next GUI or simply cancel the generation.

Figure 14:
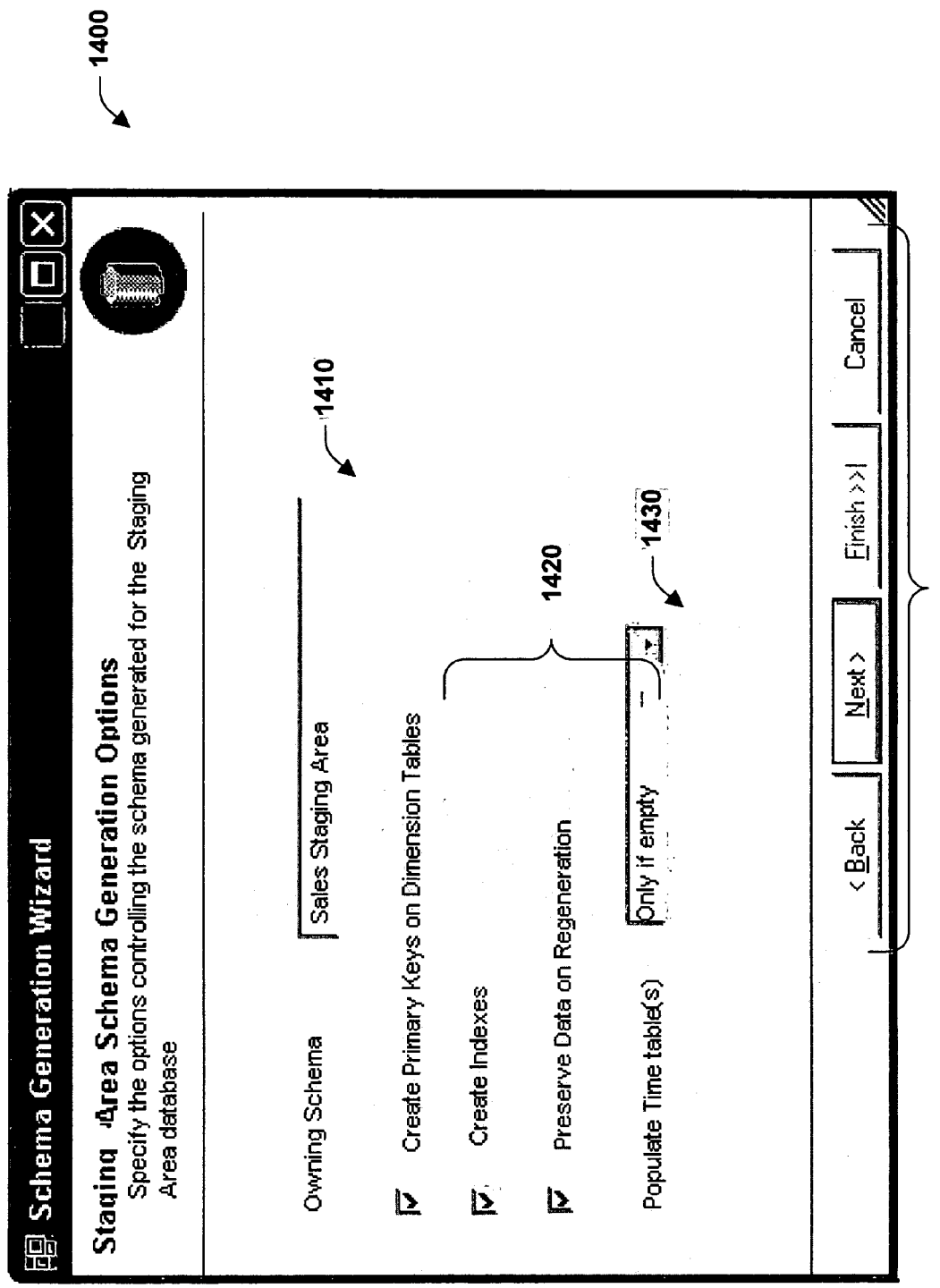
FIG. 14 is an exemplary graphical user interface in accordance with an aspect of the subject invention.

FIG. 14 illustrates a graphical user interface 1400 for specifying staging area options in accordance with an aspect of the subject invention. GUI 1400 allows a user to select options controlling the schema generated as well as other things such as preservation of data for a staging area database. A text box 1410 is provided for specification of the owning schema for the stage area database. In this instance, text box 1410 indicates that the schema is called "Sales Staging Area." There are several check boxes 1420 below the text box 1410 for selection. This exemplary GUI 1400 includes check boxes 1420 for creation of primary keys on dimension tables, creation of indexes, and preservation of data on regeneration. A drop-down menu 1330 is also provided in GUI 1300 to specify whether and when time tables will be populated. Drop-down menu 1430 can include the values "true," "false," and "only if empty." Finally, navigational buttons 1440 are provided to move to the next GUI, move back to the previous GUI or simply cancel generation.

Figure 15:
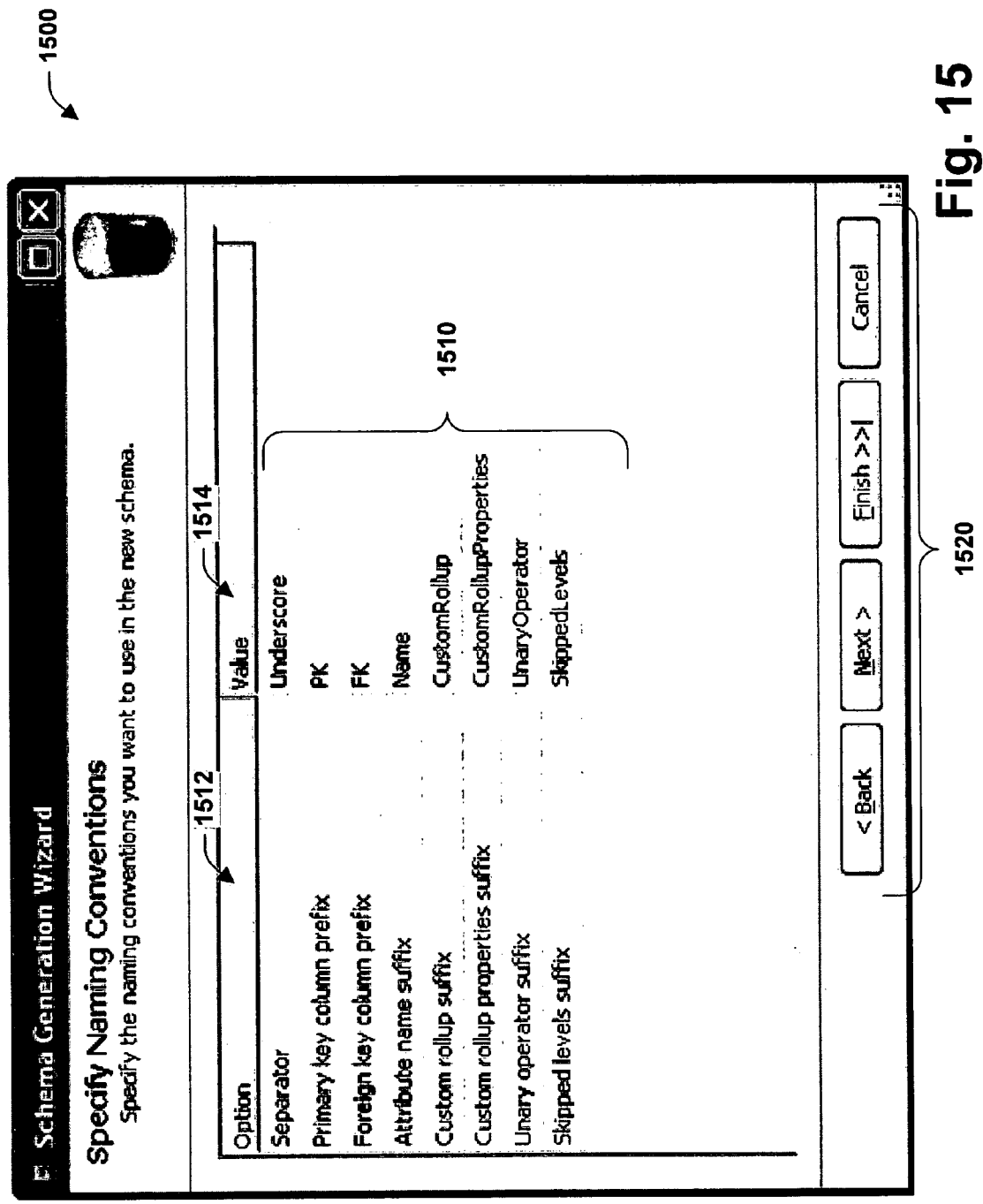
FIG. 15 is an exemplary graphical user interface in accordance with an aspect of the subject invention.

FIG. 15 depicts a GUI 1500 for specification of naming conventions in accordance with an aspect of the subject invention. GUI 1500 facilitates specification of naming conventions for use in the generated schema(s). Although a generation system can employ its own default naming conventions, GUI 1500 empowers users to specify options for one or more for naming conventions. In particular, text box 1510 is provided for name convention specification. Text box 1510 is divided into two columns 1512 and 1514 for specification of an option name or identifier and the value assigned thereto. In this GUI, for example, the separator is to be an underscore. Accordingly, an underscore should be utilized as a separator rather than a space for instance, thus "Customer Name" becomes "Customer_Name." Furthermore, it is noted that primary key names should include the prefix "PK," for example "PK_CustomerID." Additionally, GUI 1500 can include navigational buttons 1520 for moving to the next GUI page, moving back, finishing specification of the options and canceling generation.

Figure 16:
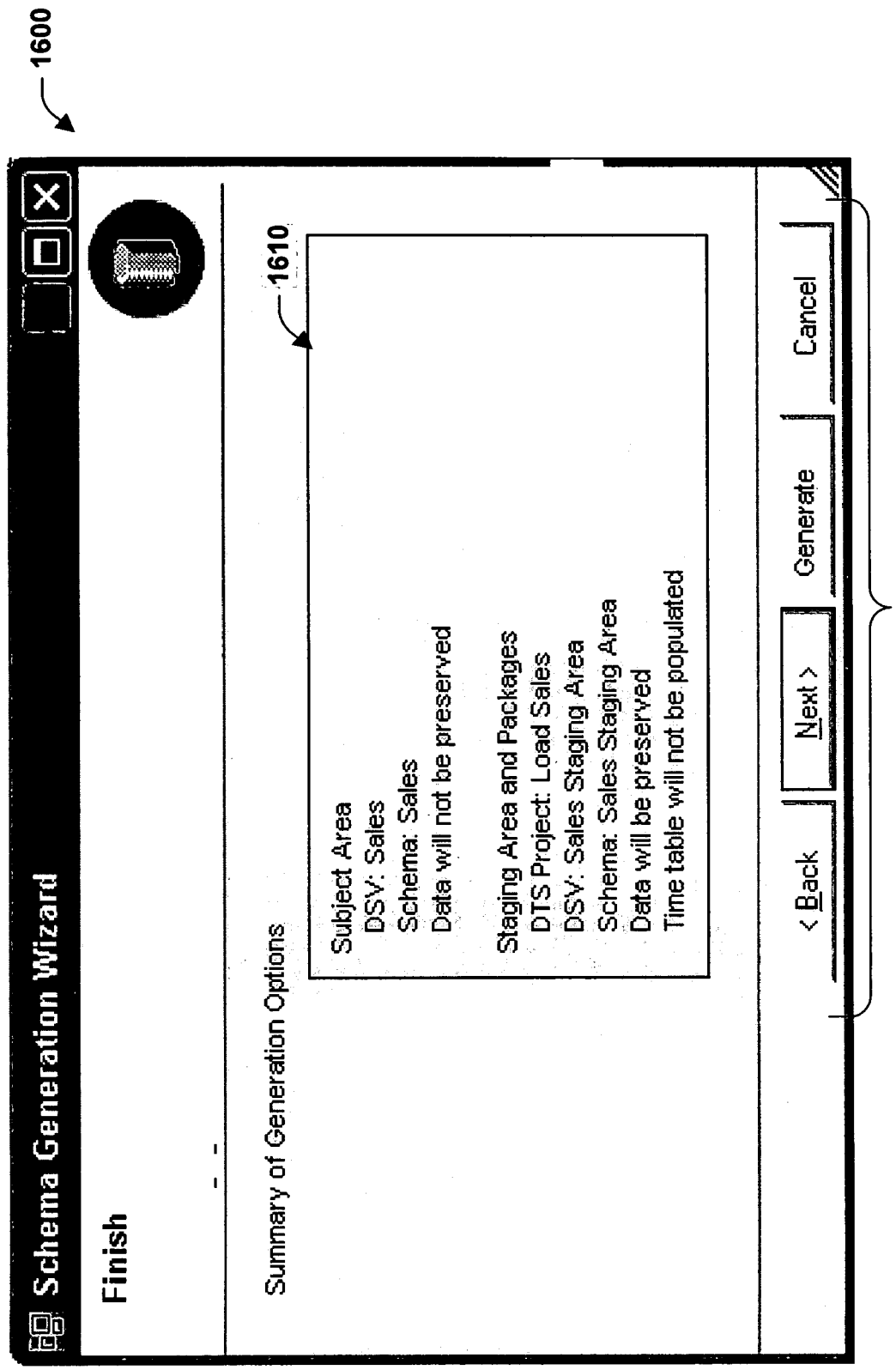
FIG. 16 is an exemplary graphical user interface in accordance with an aspect of the subject invention.

FIG. 16 illustrates a GUI 1600 for summarizing the generation options specified in accordance with an aspect of the invention. GUI 1600 can be presented at the end of option selection to confirm user selection and other input. The options are presented in a text box or window 1610. Here, the generation options are summarized to include generation of a subject area database named "Sales" with a data source view by the same name, a staging area database called "Sales Staging Area" with a data source view by the same name, as well as one or more load components (referred to as DTS) for loading the Sales database from the staging area database. It is further noted in window 1610 that the data will not be preserved upon regeneration and that a time table will not be populated. The GUI 1600 also includes buttons 1620 for selection to go back to the last GUI, to move forward to the next GUI, to generate the specified databases and load components, and to cancel generation.

Figure 17:
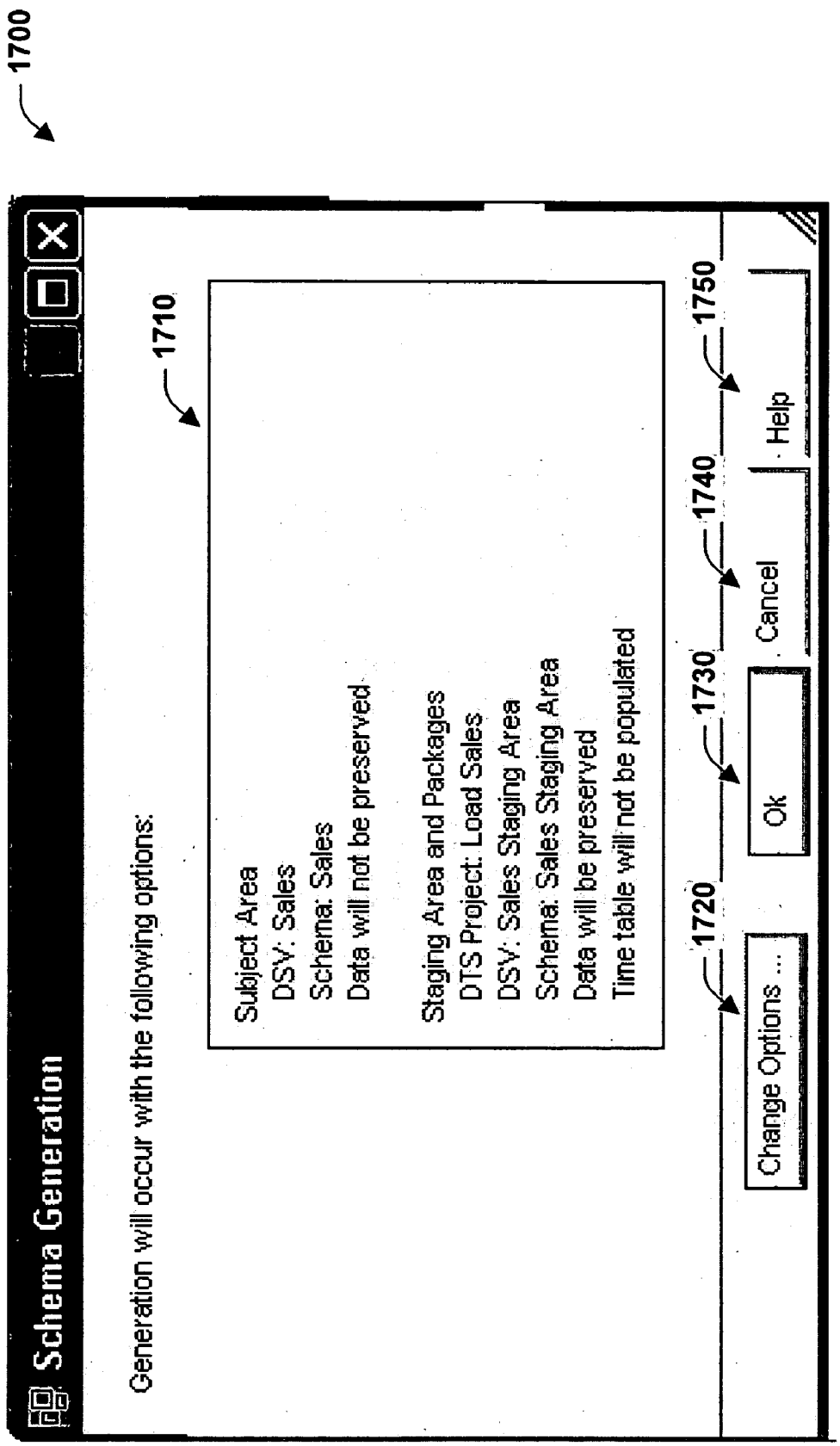
FIG. 17 is an exemplary dialog box in accordance with an aspect of the subject invention.

Upon selection of the generate button 1620 (FIG. 16), dialog box 1700 of FIG. 17 can be presented to a user. The dialog box 1700 can again summarize the generation options in a window or text box 1710. Furthermore, a button 1720 is provided to allow a user to change the options specified. If the button 1720 is selected the generation wizard and associated, GUIs can be launched again to allow a user to change the options specified. Button 1730 is provided to allow a user to indicate that the options are correct as summarized and that generation should be started. Button 1740 allows a user to cancel and close the dialog box. Finally, button 1750 is provided to call for help. In particular, a new window can be spawned to provide a user with assistance.

Figure 18:
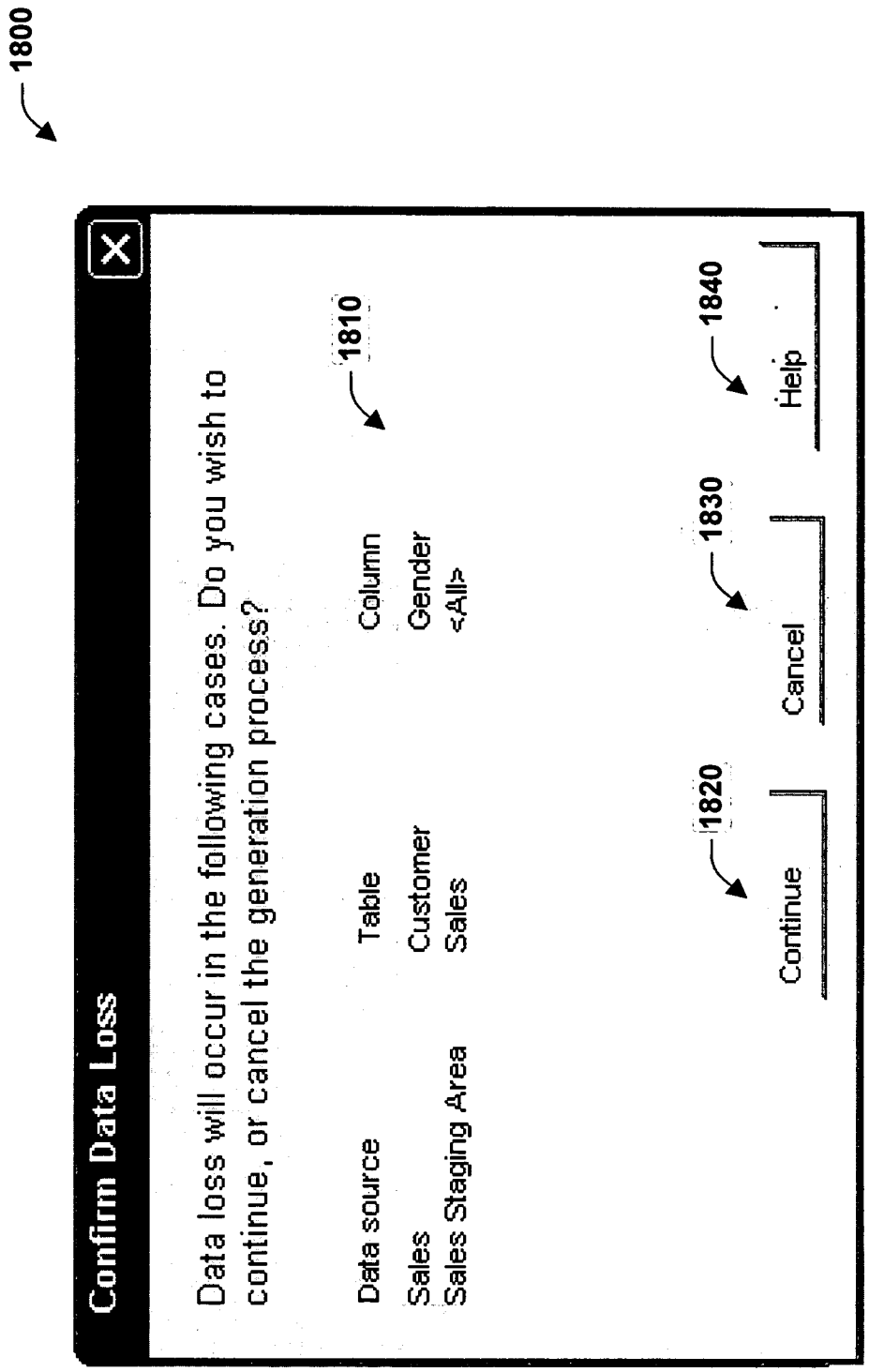
FIG. 18 is an exemplary dialog box in accordance with an aspect of the subject invention.

Turning to FIG. 18, a dialog box 1800 is illustrated in accordance with an aspect of the invention. If during generation or regeneration it is determined that data loss will occur and the option has been selected to preserve data, then dialog box 1800 will be displayed. Text box 1810 provides specific information regarding data that will be lost. In particular, the data source, the table and the column can be identified where data will be lost. In this instance, dialog box 1800 indicates that in the sales subject area database the column "Gender" will be lost in the customer table and in the sales staging area database the entire sales table will be lost. Buttons 1820, 1830 and 1840 provide a user with options to designate the action to take. Continue button 1820 indicates that generation should continue and the data lost. Cancel button 1830 indicates that generation should be canceled, while the help button 1840 designates that a help window or application should be spawned to assist the user. Additionally, while not illustrated, a third option could be provided where the data to be lost is saved to an alternate location and then the generation process proceeds resulting in the loss of such data. In this instance, the lost data can always be restored or rolled back at a later time, if necessary.

In view of the exemplary systems described supra, methodologies that may be implemented in accordance with the present invention will be better appreciated with reference to the flow charts of FIGS. 19-24. While for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or media.

Figure 19:
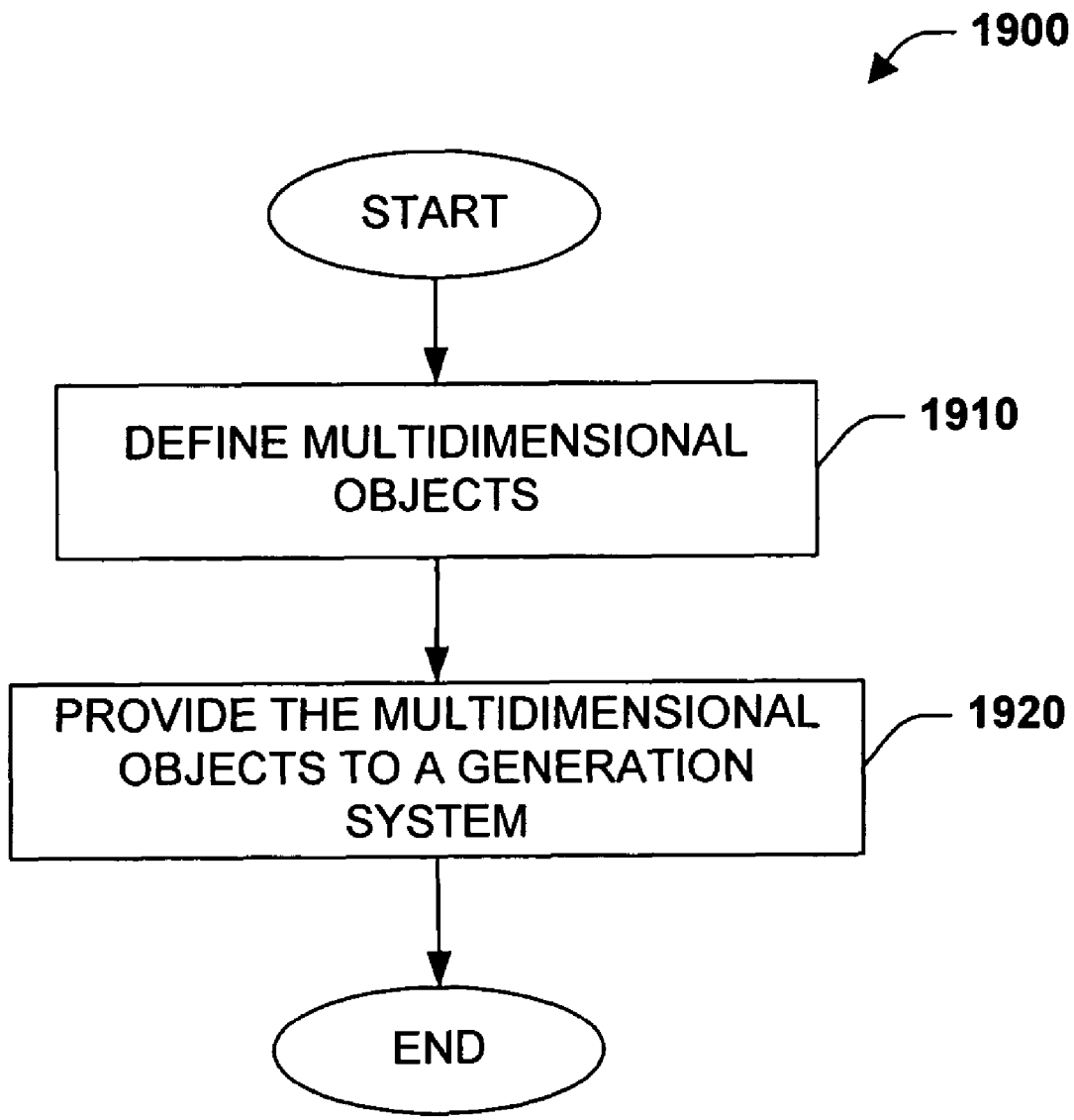
FIG. 19 is a flow chart diagram of a method of schema and database generation in accordance with an aspect of the subject invention.

Turning to FIG. 19, a method 1900 of database generation is depicted in accordance with an aspect of the subject invention. More specifically, method 1900 concerns a method of generating a system to support multidimensional data analysis utilizing a relational database management system. At 1910, multidimensional database objects are defined. Multidimensional database objects can include but are not limited to cubes, dimensions, and properties thereof. Definitions of these objects can be accomplished in a variety of manners. For example, multidimensional objects can be defined manually and/or utilizing wizards and templates. Furthermore, the initial definition of multidimensional objects can be accomplished by creating them from some data source and data source view and the cutting the bindings to the data source view and data source. Once these multidimensional objects are defined, they can be provided to a generation system at 1920. The generation system can then automatically generate a relational database schema to support the multidimensional objects, apply the schema to a database and populate that database with data from one or more data sources. This is advantageous at least because it allows for quick prototyping of a data warehouse application, allows an analyst to work focused on the end user model, and avoids the need to understand how to build a relational database.

Figure 20:
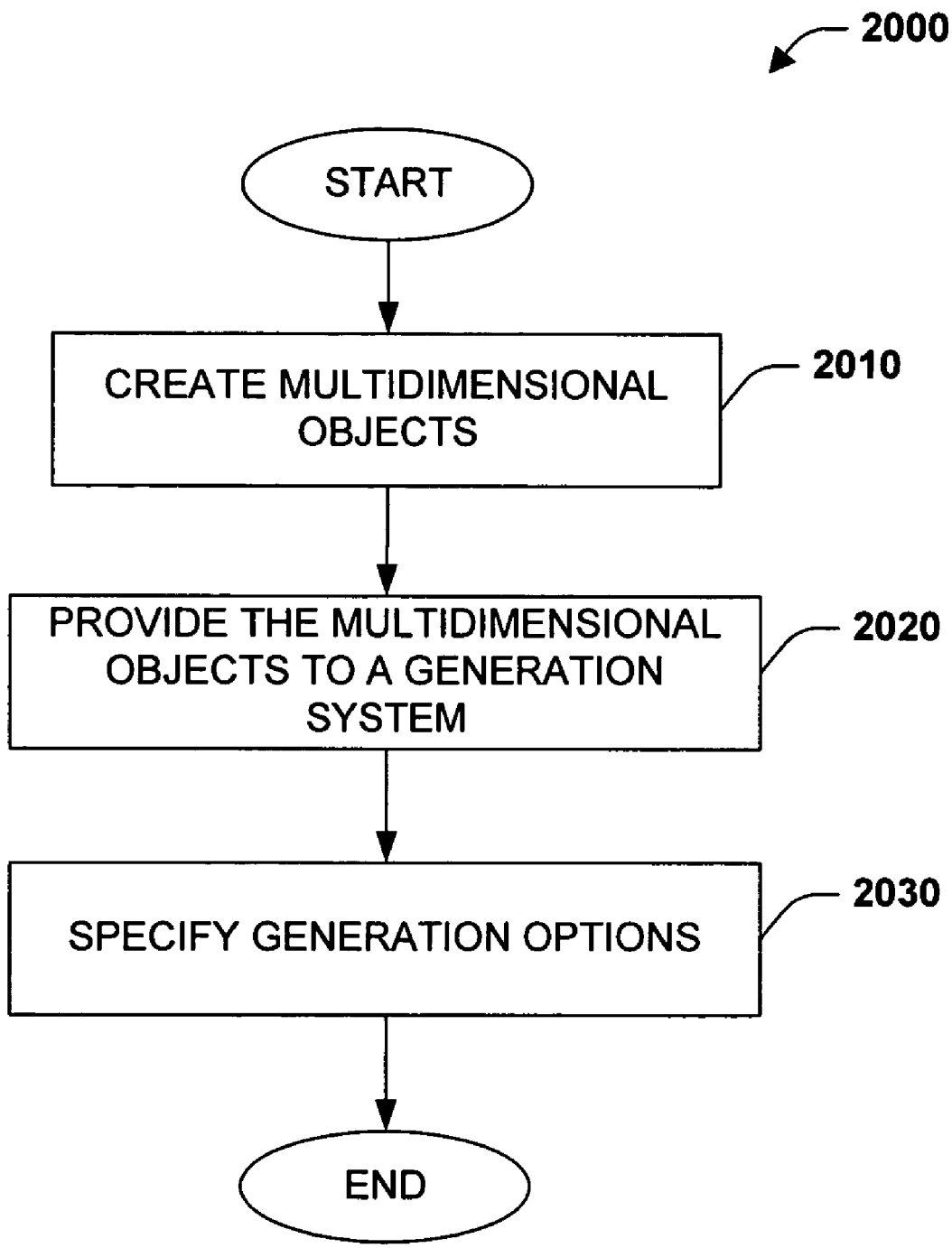
FIG. 20 is a flow chart diagram of a database generation methodology in accordance with an aspect of the subject invention.

FIG. 20 depicts a method of database generation 2000 in accordance with an aspect of the subject invention. Method 2000 like method 1900 (FIG. 19) describes a method of generating a multidimensional database system utilizing a relational database management system. At 2010, multidimensional objects are created. This corresponds to generation of a multidimensional database model. The objects can include but are not limited to cubes, dimensions, and properties thereof. Furthermore, creation of multidimensional database objects can be accomplished in many different ways. For example, a user could create multidimensional objects manually, automatically using a wizard, and/or utilizing templates. Once multidimensional objects are created or otherwise located, they can be provided to a generation system at 2020. At 2030, a user can specify generation options and provide them to the generation system as well. Method 2000 assumes a more advanced user than method 1900. Here, generation options can be specified. Such options can include but are not limited to specifying whether a staging area database will be created and if so the load components necessary to load data from the staging area database to the main subject area database. Furthermore options can be specified concerning whether primary keys with be created on dimension tables, whether indexes will be created whether referential integrity checks should be performed upon loading and whether a time table should be created and populated. Still further yet, options can be specified regarding the load component(s) such as whether particular measure groups will be partitioned, whether load actions should be logged, how errors should be handled, and how slowly changing dimensions should be handled, among other things. Once the multidimensional objects are provided to the generation system and the options are specified, the system can then generate and populate a relational database to support the multidimensional objects.

Figure 21:
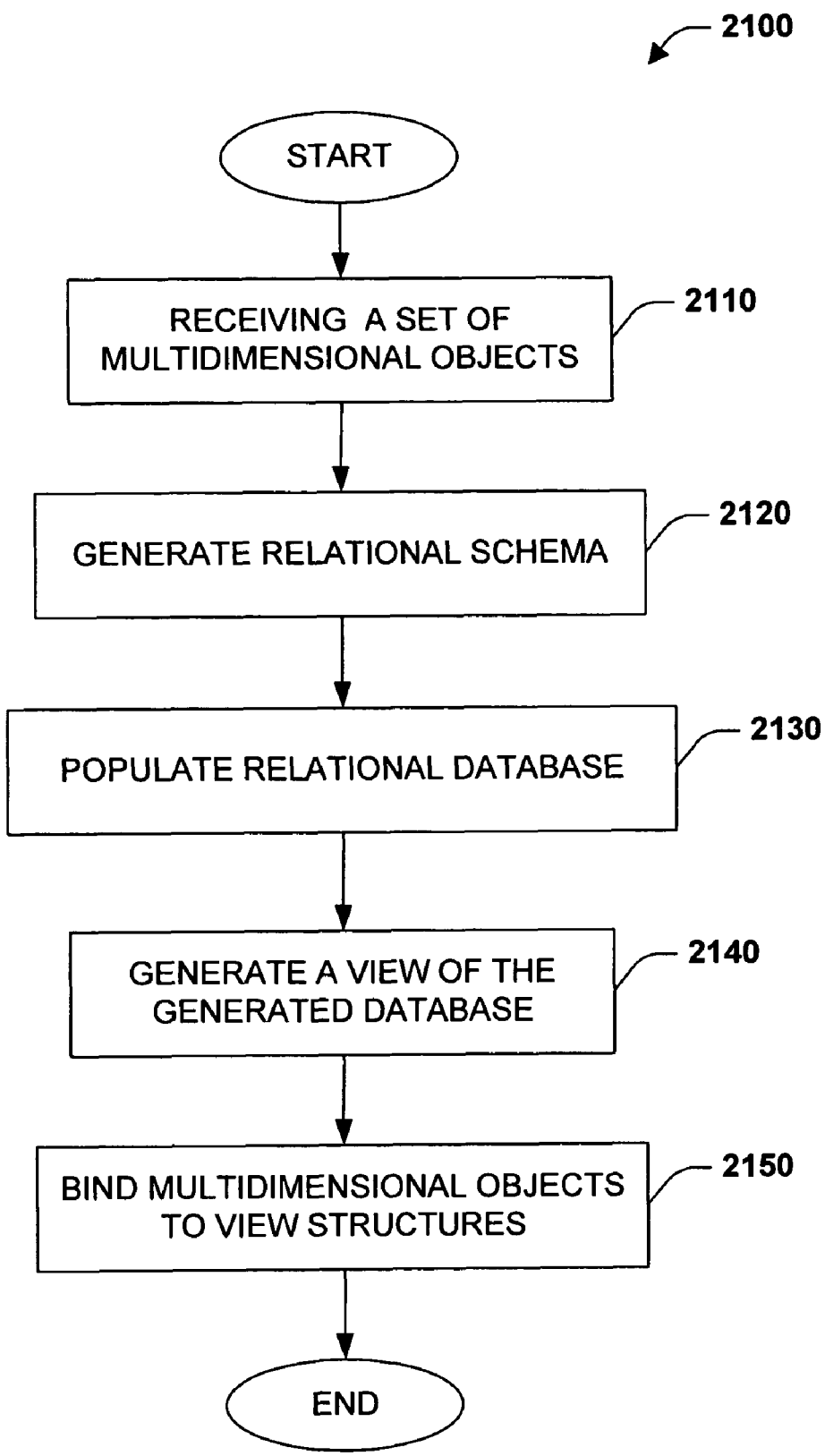
FIG. 21 is a flow chart diagram of a method of generating a multidimensional support system in accordance with an aspect of the subject invention.

FIG. 21 depicts a method 2100 of constructing a system to support multidimensional instructions and/or queries in accordance with an aspect of the invention. At 2110, the system receives a set of multidimensional objects. Multidimensional objects can include but are not limited to cubes, dimensions, and properties thereof. Upon receipt of the multidimensional objects, a relational schema is generated at 2120. The relational schema can be comprised of one or more tables, columns, and rows, for example in a star or snowflake model or schema. At 2130, the schema can be applied to a database and the database or database schema can be populated with data from one or more data sources. At 2140, a database view can be generated including the schema objects (e.g., tables). At 2150, the multidimensional objects are mapped or bound to the view objects. In this manner, a multidimensional database instruction or query can be converted to a relational database instruction or query and executed against the populated database.

Figure 22:
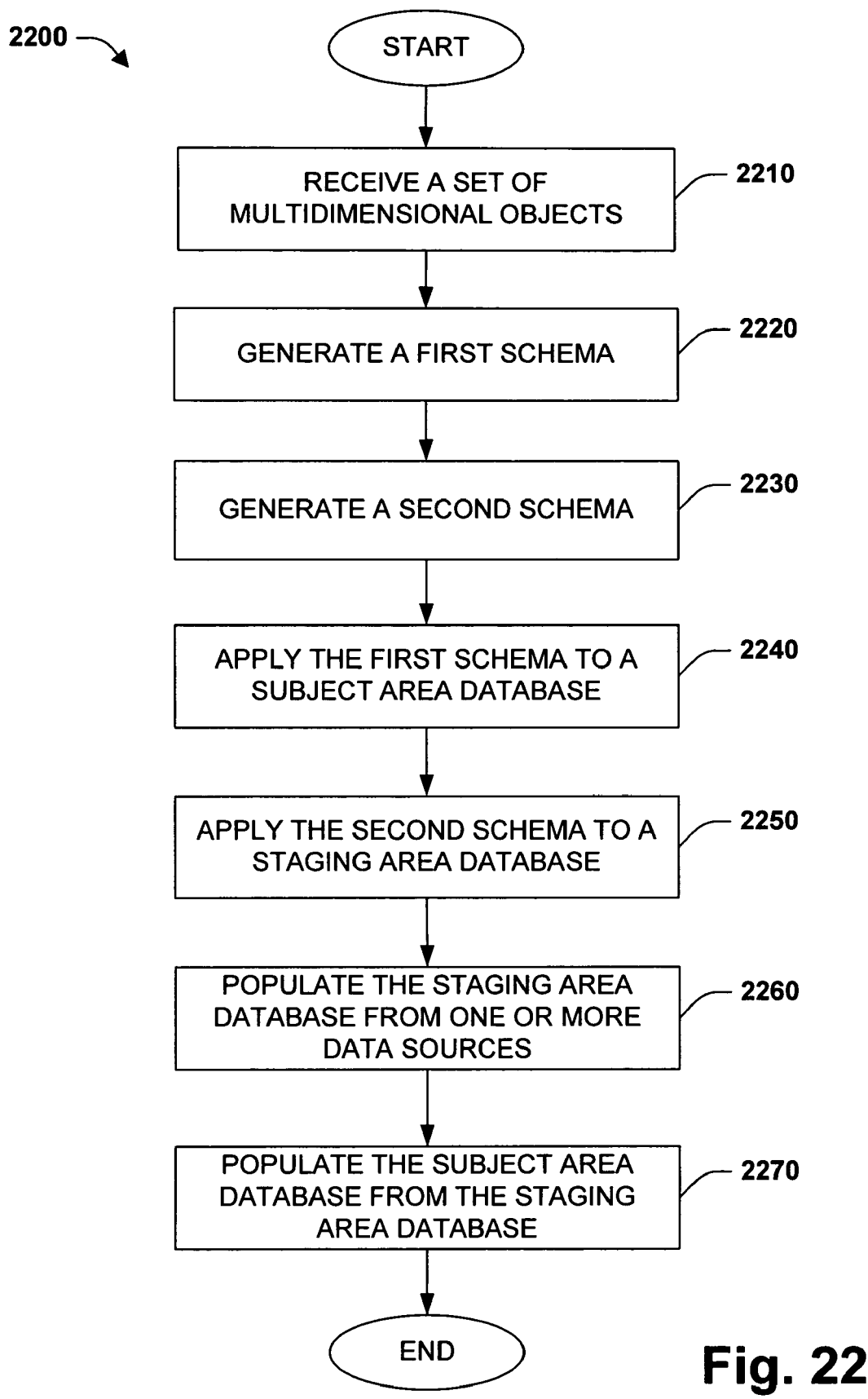
FIG. 22 is a flow chart diagram of a method of generating a multidimensional support system in accordance with an aspect of the subject invention.

FIG. 22 illustrates a method 2200 of constructing a multidimensional support system in accordance with an aspect of the subject invention. At 2210, a set of multidimensional objects including but not limited to cubes, dimensions and properties thereof is received. At 2220, a first schema is generated. At 2230, a second schema is generated. At 2240, the first schema is applied to a subject area database. The subject area database is a relational database storing cleansed data, which can be retrieved to satisfy multidimensional database queries. At 2250, the second schema is applied to a staging area database. The staging area database is a relational database for temporarily storing data prior to loading to the subject area database. At 2260, the staging area database is populated with data from one or more heterogeneous sources. At 2270, the subject area database is loaded with data from the staging area database. It should be appreciated that the loading from staging area to subject area can also include error checking and correcting, among other things. For example, referential integrity can be checked prior to saving data to the subject area database. Once, the subject area database is loaded or populated. Multidimensional instructions or queries can be executed against the relational store. Of course, the multidimensional instructions or queries would first be converted to relational database instructions or queries and executed by a query processor associated with the relational database. Results can then be retrieved, formatted for multidimensional queries, and returned.

Figure 23:
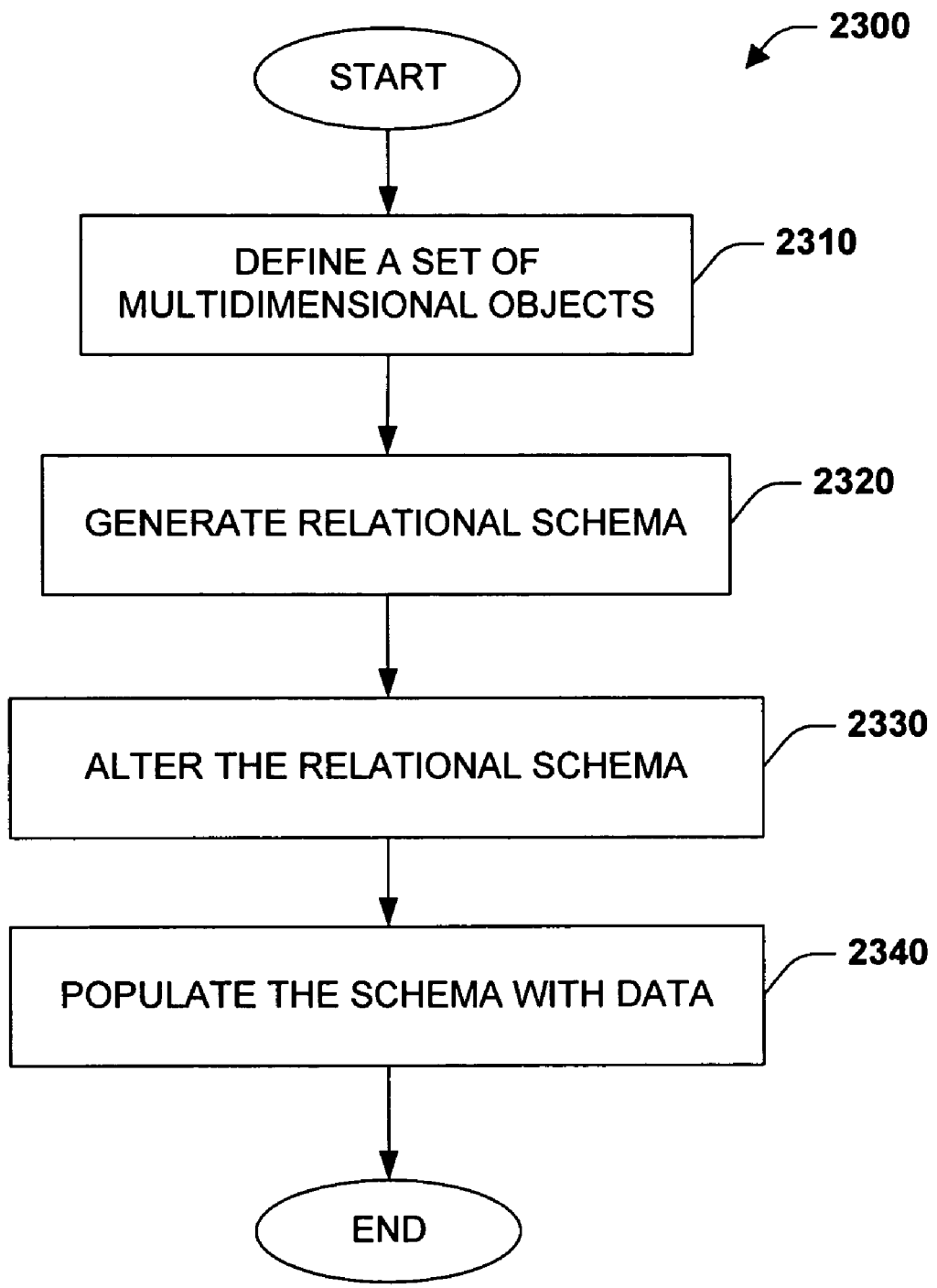
FIG. 23 is a flow chart diagram of a method of schema generation in accordance with an aspect of the subject invention.

FIG. 23 depicts a schema generation methodology 2300 in accordance with an aspect of the subject invention. At 2310, a set of multidimensional objects are generated or defined. Such multidimensional objects can correspond to cubes, dimensions and properties thereof. Object generation can include but is not limited to manual specification, creation utilizing a wizard, and creation utilizing one or more templates. Once the multidimensional objects are generated, then at 2320 at least one relational schema is generated and proposed to support the objects. The schema elements (e.g. tables) can be ultimately bound or mapped to the multidimensional objects to support data access and querying. At 2330, the proposed schema can be modified. For example, a table attribute (e.g., row, column) name can be altered or a new table could be added. Subsequently, the schema as modified can be applied to a database and populated with data at 2340.

Figure 24:
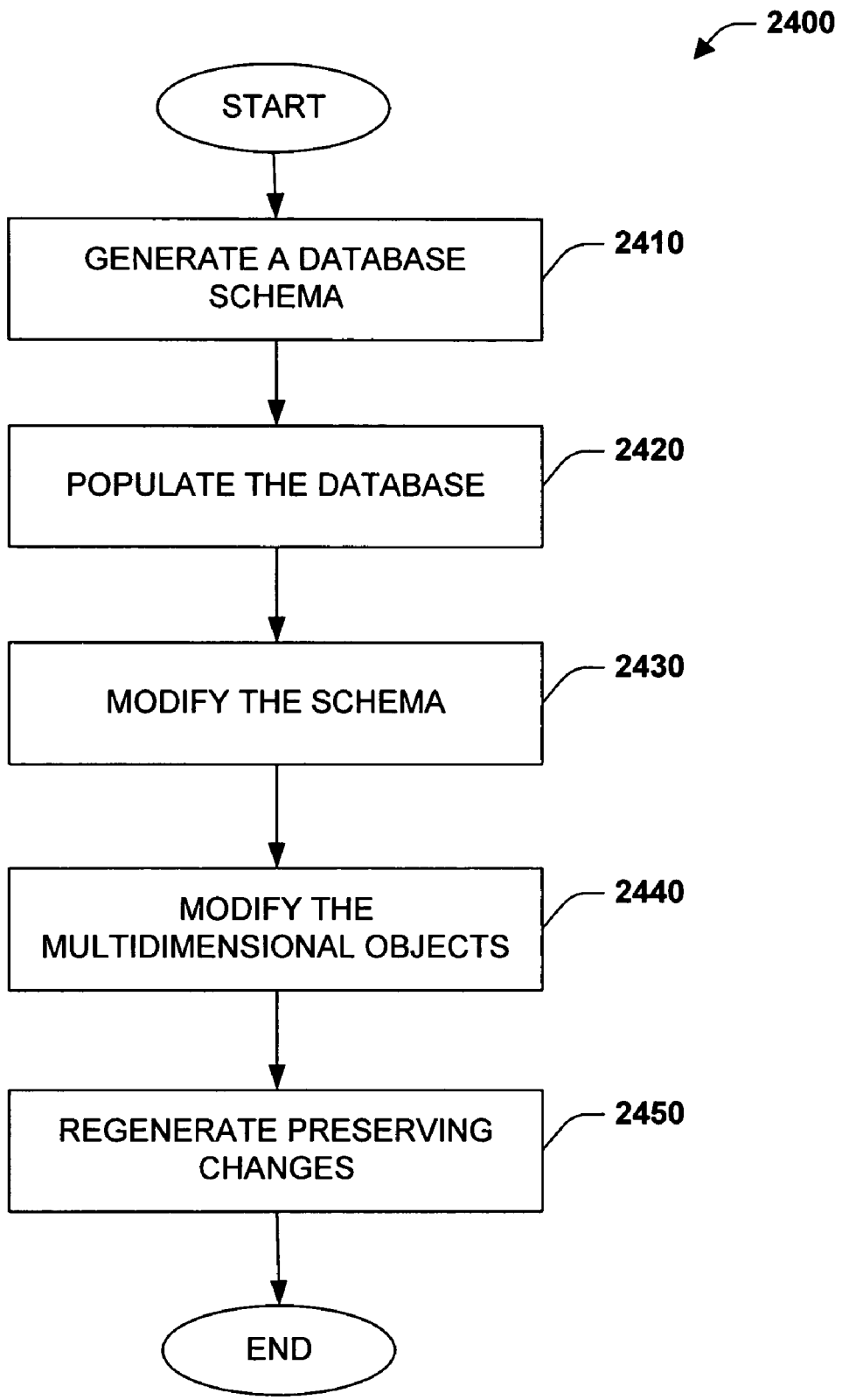
FIG. 24 is a flow chart diagram of a method of schema generation in accordance with an aspect of the subject invention.

FIG. 24 illustrates an incremental schema generation methodology 2400 in accordance with an aspect of the subject invention. At 2410, a database schema is generated. The schema is a relational database schema comprising one or more tables, for example in a star or snowflake format, supporting one or more previously defined multidimensional objects. At 2420, the schema is applied to a database and populated with data. At 2430, the schema is modified. For example, a table name or attribute is altered or a table, row, or column is deleted. This can be accomplished by either directly modifying the generated database or by way of a data source view. At 2440, the original multidimensional objects are modified. At 2450, the database schema and database is regenerated to reflect changes made to the multidimensional objects while preserving changes made to the database schema prior to regeneration. It should be appreciated that although described together changes can be made solely to the database schema or the multidimensional model and regeneration would only be concerned with one set of changes. Furthermore, it should be appreciated that if the changes to the multidimensional objects and the changes to the database schema are conflicting such that they cannot coexist, notification can be provided to a user. The user can then decide on a course of action such as canceling the regeneration, proceeding and allowing particular changes made to schema to be lost or saving data and then proceeding with regeneration such that any data loss can be rolled back, if necessary. In any event, data is to be preserved as far as possible. Data would be totally preserved in common scenarios such as adding or removing attributes, and adding and removing dimensions from a measure group. However, a change may not be able to be preserved, for example, if a data type is changed or dropping such data would cause cascading deletion (e.g., changing the key in a dimension to a different attribute, with non-unique or null data).

For purposes of clarity, consider the following changes to multidimensional objects and relational schema as well as the result or treatment thereof during regeneration. If a multidimensional object (e.g., dimension, cube, attribute . . . ) is deleted then the associated database object (e.g., table, column . . . ) is deleted. If a multidimensional object is renamed, then the associated database object is renamed and data is preserved rather than being treated as dropped. If a multidimensional object is changed, for example, the data type is altered, than the associated database object(s) are modified accordingly. Finally, if a new multidimensional object is added, then the associated database objects are created. Changes to the relational schema can be effectuated in a similar manner. For example, if a database object is renamed, then upon regeneration the rename will be preserved. Likewise, if a new database object such as a table or column is added, then these additions will be preserved upon regeneration.

Figure 25:
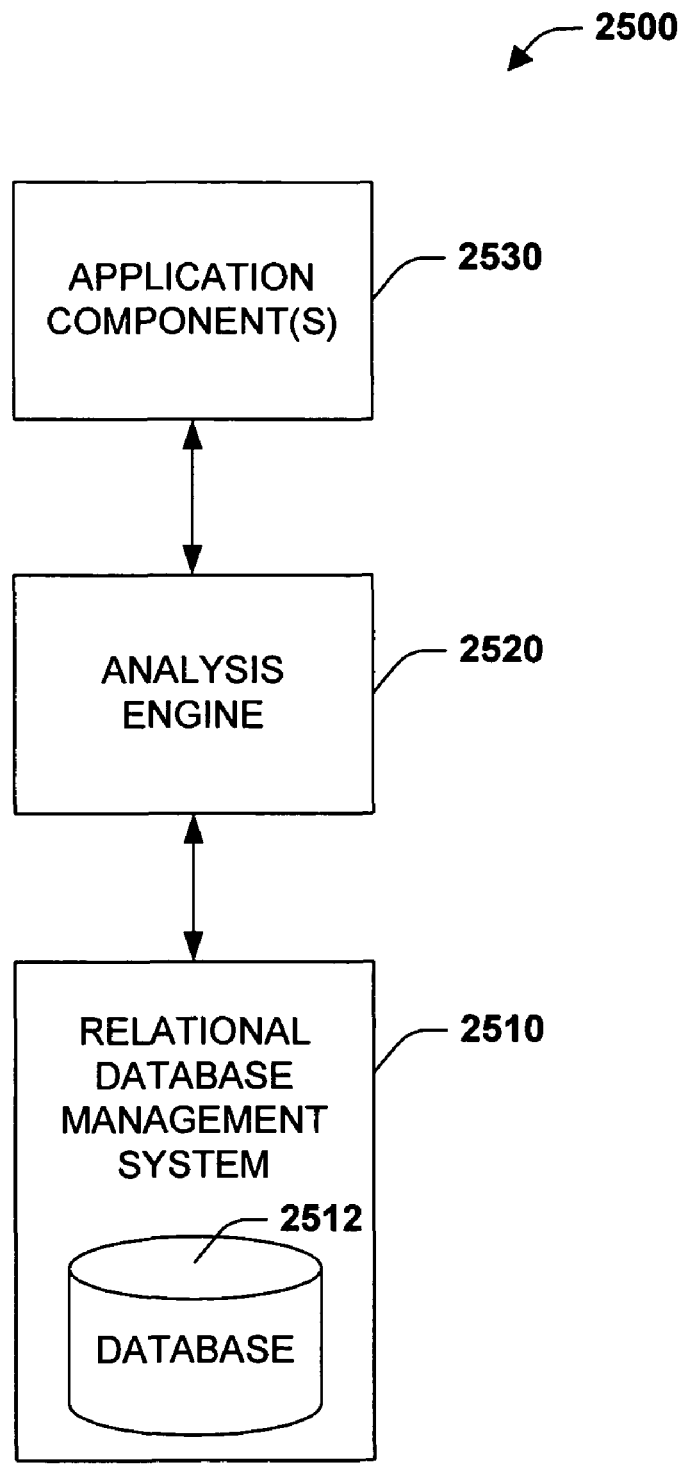
FIG. 25 is a schematic block diagram of a sample data warehouse environment in which aspects of the subject invention can be incorporated.

FIG. 25 is a schematic block diagram of a sample database warehouse environment 2500 in which aspects of the subject invention can interact. Environment 2500 can include a relational database management system (RDBMS) 2510, an analysis engine 2520, and one or more application components 2530. RDBMS 2510 includes at least one relational database 2512 that acts as a repository for data from one or more data sources. It should be appreciated that as with database management systems RDBMS 2510 can include a query processor (not shown) for responding to queries for data from database 2512. Analysis engine 2520 can specify and retrieve data from the RDBMS 2510. Furthermore, the analysis engine 2520 can perform complex operations on the retrieved or received data. The analysis engine 2520 can also perform mapping between a multidimensional model and the database schema. The analysis engine 2520 can reside on the same computer platform as the RDBMS 2510, be integrated into the RDBMS 2510, operate on a middle-tier server in a three-tier architecture, or some combination thereof. Application components 2530 can include any number of software programs including instructions transforming a computer into a special purpose machine and/or tools for interacting with stored data. For example, application components can include but are not limited to tools for performing data analysis, querying, reporting, and data mining. Application components 2530 can request and receive/retrieve data by transmitting queries to the analysis engine 2520. This queries can be multidimensional such as those specified by MDX (MultiDimensional eXpresions) and/or relational queries such as those specified in the SQL (Structured Query Language). If the query is a multidimensional query, than the analysis engine 2520 can transform the query into one or more relational query statements, retrieve data from the database, format the retrieved data into a multidimensional format, and return the data to the requesting application component 2530.

Figure 26:
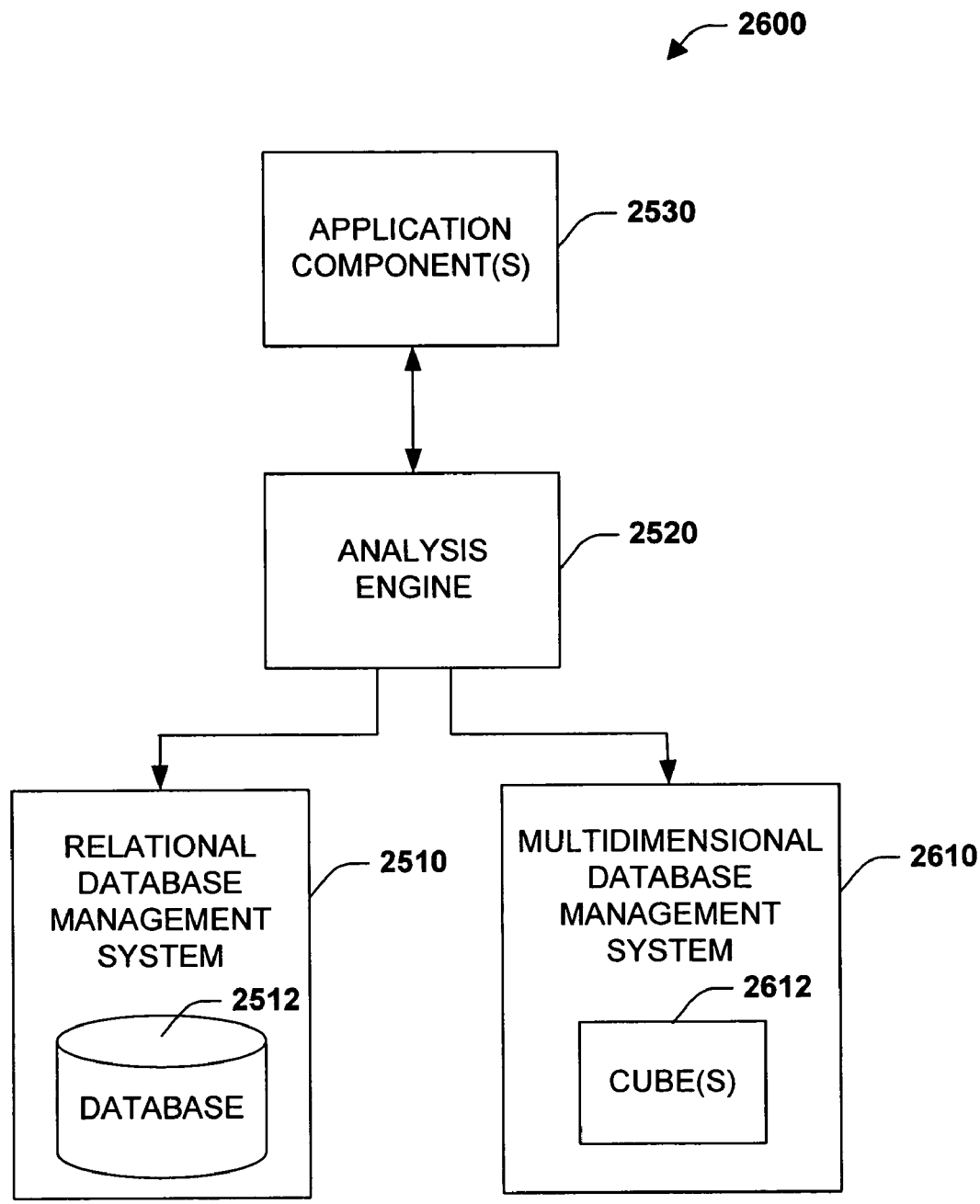
FIG. 26 is a schematic block diagram of a sample data warehouse environment in which aspects of the subject invention can be incorporated.

FIG. 26 is a block diagram of another sample database warehouse environment 2600 in which aspects of the subject invention can interact. Similar to environment 2500 (FIG. 25), sample database warehouse includes relational database management system 2510, analysis engine 2520 and application component(s) 2530. However, data warehouse environment 2600 also includes a multidimensional database management system (MDDBMS) 2610. As previously described, RDBMS 2510 includes at least one relational database 2512 that acts as a repository for data from one or more data sources. Analysis engine 2520 can specify and retrieve data from the RDBMS 2510 as well as perform complex operations on the retrieved or received data. The analysis engine 2520 can also perform mapping between a multidimensional model and the relational database schema. MDDBMS 2610 provides another alternative for data storage. MDDBS 2610 includes one or more database cubes 2612 stored as multidimensional arrays. This is the true physical multidimensional database model rather than a logical implementation thereof. Accordingly, multidimensional queries can be directly executed by MDDBMS 2610 rather than indirectly through a mapping provided by analysis engine 2520. MDDBMS 2610 provides for fast data retrieval and complex calculations return quickly as they are pre-generated with a cube. However, MDDBMS is limited in the amount of data it can process. RDBMS 2510 can often be slow in retrieving data, but is able to handle large amounts of data. Data warehouse environment 2600 is thus advantageous in that it combines the benefits of both models. Accordingly, some data can be stored in a cube in MDDBMS 2610 and other data can be housed in a relational database tables in RDBMS 2510. Application components 2530 can include any number of software programs including instructions transforming a computer into a special purpose machine and/or tools for interacting with stored data. Application components 2530 can request and receive/retrieve data by transmitting queries to the analysis engine 2520. The analysis engine 2560 can then retrieve data from one or both of RDBMS 2510 and MDDBMS 2610 and provide it to the requesting application component 2530. Finally, it should be appreciated that RDBMS 2510 and MDDBMS 2610 can reside on the same or different computer platform (e.g. server). The analysis engine 2520 can reside on the same computer platform as the RDBMS 2510 and/or MDDBMS 2610, be integrated into the RDBMS 2510 and/or MDDBMS 2610, operate on a middle-tier server in a three-tier architecture, or some combination thereof.

In either or both of sample data warehouse environments, 2500 and 2600, aspects of the subject invention can be employed, among other things, to generate a relational schema and populate at least one relational database. Aspects of the invention can also be employed in generating multidimensional objects or a multidimensional schema that is supported by the relational schema. Furthermore, aspects of the invention can be employed to iteratively generate and/or modify a relational database, schema, or multidimensional model.

Figure 27:
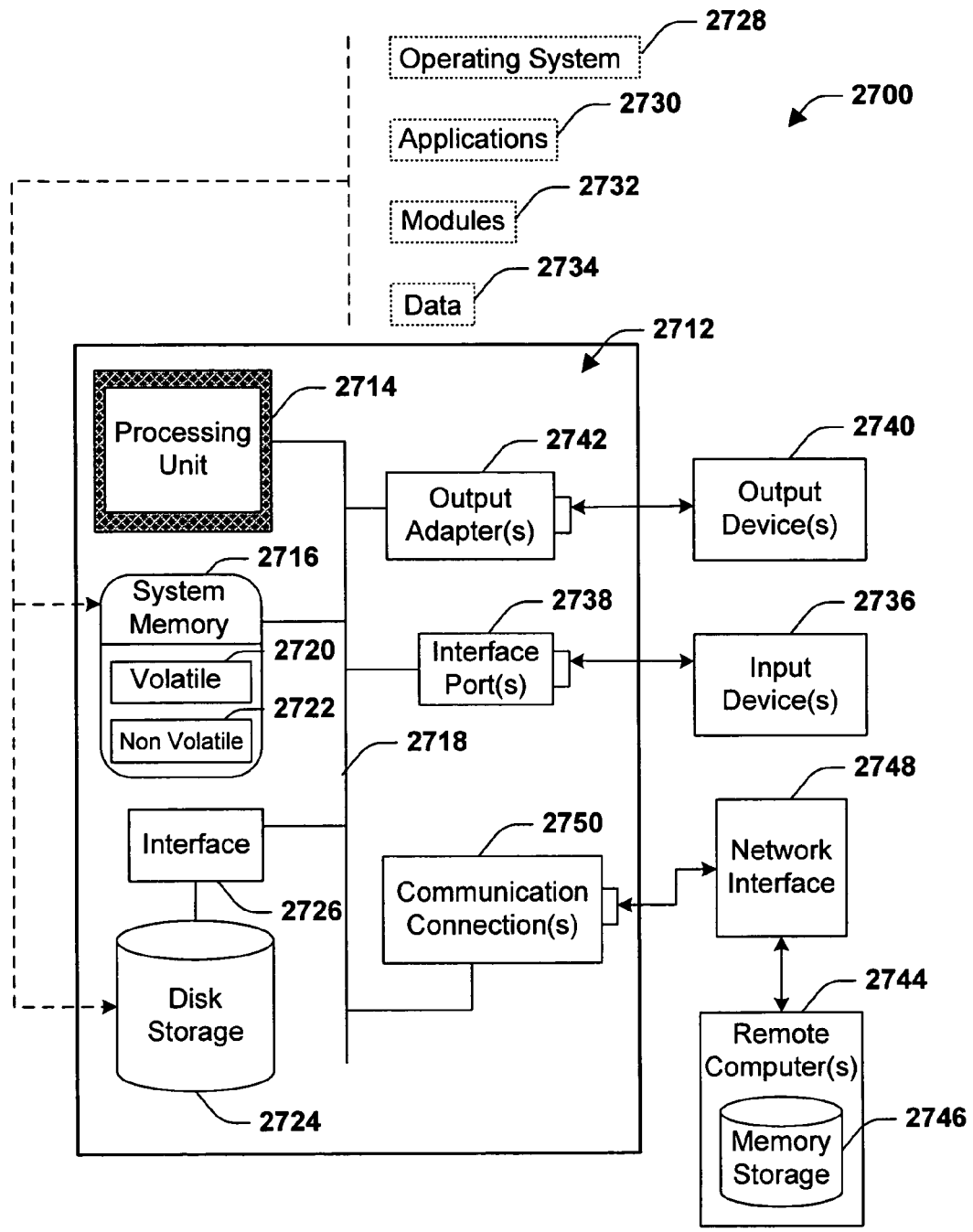
FIG. 27 is a schematic block diagram illustrating a suitable operating environment in accordance with an aspect of the present invention.
Figure 28:
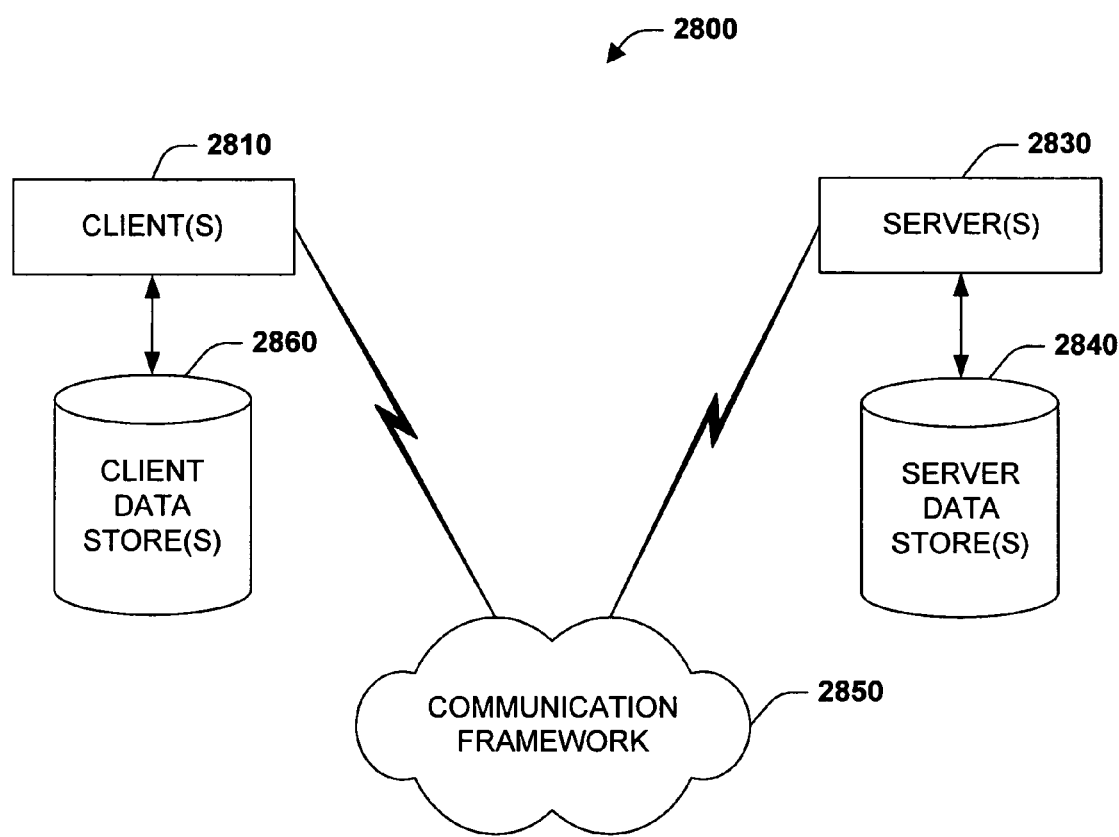
FIG. 28 is a schematic block diagram of a sample-computing environment with which the present invention can interact.

In order to provide a context for the various aspects of the invention, FIGS. 27 and 28 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 27, an exemplary environment 2700 for implementing various aspects of the invention includes a computer 2712. The computer 2712 includes a processing unit 2714, a system memory 2716, and a system bus 2718. The system bus 2718 couples system components including, but not limited to, the system memory 2716 to the processing unit 2714. The processing unit 2714 can be any of various available processors. Dual microprocessors and other multi-processor architectures also can be employed as the processing unit 2714.

The system bus 2718 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2716 includes volatile memory 2720 and nonvolatile memory 2722. The basic input/output system (BIOS), containing the basic routines to transfer information between elements within the computer 2712, such as during start-up, is stored in nonvolatile memory 2722. By way of illustration, and not limitation, nonvolatile memory 2722 can include read only memory (ROM), programmable ROM (PROM), electrically programmable ROM (EPROM), electrically erasable ROM (EEPROM), or flash memory. Volatile memory 2720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2712 also includes removable/non-removable, volatile/non-volatile computer storage media. FIG. 27 illustrates, for example disk storage 2724. Disk storage 4124 includes, but is not limited to, devices like a magnetic disk drive, floppy disk drive, tape drive, Jaz drive, Zip drive, LS-100 drive, flash memory card, or memory stick. In addition, disk storage 2724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2724 to the system bus 2718, a removable or non-removable interface is typically used such as interface 2726.

It is to be appreciated that FIG. 27 describes software that acts as an intermediary between users and the basic computer resources described in suitable operating environment 2710. Such software includes an operating system 2728. Operating system 2728, which can be stored on disk storage 2724, acts to control and allocate resources of the computer system 2712. System applications 2730 take advantage of the management of resources by operating system 2728 through program modules 2732 and program data 2734 stored either in system memory 2716 or on disk storage 2724. It is to be appreciated that the present invention can be implemented with various operating systems or combinations of operating systems.

A user enters commands or information into the computer 2712 through input device(s) 2736. Input devices 2736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2714 through the system bus 2718 via interface port(s)

2738. Interface port(s) 2738 include, for example, a serial port, a parallel port, a game port, and a universal serial bus (USB). Output device(s) 2740 use some of the same type of ports as input device(s) 2736. Thus, for example, a USB port may be used to provide input to computer 2712 and to output information from computer 2712 to an output device 2740. Output adapter 2742 is provided to illustrate that there are some output devices 2740 like displays (e.g., flat panel and CRT), speakers, and printers, among other output devices 2740 that require special adapters. The output adapters 2742 include, by way of illustration and not limitation, video and sound cards that provide a means of connection between the output device 2740 and the system bus 2718. It should be noted that other devices and/or systems of devices provide both input and output capabilities such as remote computer(s) 2744.

Computer 2712 can operate in a networked environment using logical connections to one or more remote computers, such as remote computer(s) 2744. The remote computer(s) 2744 can be a personal computer, a server, a router, a network PC, a workstation, a microprocessor based appliance, a peer device or other common network node and the like, and typically includes many or all of the elements described relative to computer 2712. For purposes of brevity, only a memory storage device 2746 is illustrated with remote computer(s) 2744. Remote computer(s) 2744 is logically connected to computer 2712 through a network interface 2748 and then physically connected via communication connection 2750. Network interface 2748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereof, packet switching networks, and Digital Subscriber Lines (DSL).

Communication connection(s) 2750 refers to the hardware/software employed to connect the network interface 2748 to the bus 2718. While communication connection 2750 is shown for illustrative clarity inside computer 2712, it can also be external to computer 2712. The hardware/software necessary for connection to the network interface 2748 includes, for exemplary purposes only, internal and external technologies such as, modems including regular telephone grade modems, cable modems, power modems and DSL modems, ISDN adapters, and Ethernet cards.

FIG. 28 is a schematic block diagram of a sample-computing environment 2800 with which the present invention can interact. The system 2800 includes one or more client(s) 2810. The client(s) 2810 can be hardware and/or software (e.g., threads, processes, computing devices). The system 2800 also includes one or more server(s) 2830. The server(s) 2830 can also be hardware and/or software (e.g., threads, processes, computing devices). The server(s) 2830 can house threads to perform transformations by employing the present invention, for example. One possible communication between a client 2810 and a server 2830 may be in the form of a data packet transmitted between two or more computer processes. The system 2800 includes a communication framework 2850 that can be employed to facilitate communications between the client(s) 2810 and the server(s) 2830. The client(s) 2810 are operably connected to one or more client data store(s) 2860 that can be employed to store information local to the client(s) 2810. Similarly, the server(s) 2830 are operably connected to one or more server data store(s) 2840 that can be employed to store information local to the servers 2830.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

What is claimed is:

1. A system for building a multidimensional database comprising:
    populating database with data from one or more heterogeneous data sources utilizing one or more load components;
    a development component to facilitate specification of multidimensional object definitions in the absence of an underlying relational database, the multidimensional object definitions comprising cube definitions;
    a schema generation component that receives the definitions and automatically generates a relational database schema with relational objects associated with specific multidimensional objects, the schema generation component also receiving data concerning modifications that have been made to a previously generated relational database schema and preserves the modifications when generating an updated version of the previously generated relational database schema from a corresponding multidimensional object definition, wherein the corresponding multidimensional object definition from which the updated version of the previously generated relational database schema was generated does not contain corresponding modifications;
    a database generation component that produces a database and applies the generated schema to the database stored in a computer readable memory;
    a monitor component for detecting modifications to previously generated relational database schemas that were made by components other than the schema generation component and for providing the modifications to the schema generations component such that the modifications are preserved when the schema generation component generates updated versions of previously generated relational database schemas from multidimensional object definitions;
    the load component that aids in loading data to the database, wherein the load component comprises:
        a source adaptor and a destination adaptor configured to allow connection between one or more databases;
        a database load component configured to receive the data to be loaded from a data source and to load the data into the database;
        a flow control component configured to analyze data in the data source and determine a proper loading sequence;
        a slowly changing dimension component configured to automate handling of dimensions and other attributes that change and to specify rules for dealing with the changing attributes;

a time table generation component configured to provide multidimensional queries over a time dimension;

an error component configured to analyze the source data and/or monitor the load process to detect errors;

a log component configured to generate a log of load process operations; and a truncation component configured to remove data from the data source; and a schema modification component that enables the generated database schema to be altered in an iterative manner, wherein modification of at least one existing multidimensional model results in at least one related alteration of a related relational schema, a related database, or combination thereof, wherein a direct modification of at least a related relational schema generated from at least one multidimensional object is preserved by schema regeneration, wherein an indirect modification of at least a related relational schema generated from at least one multidimensional object is preserved by schema regeneration, facilitating both bottom-up and top-down multidimensional database interactions such that a developer can create multidimensional objects in both directions by creating multidimensional objects over existing multidimensional objects in the bottom-up multidimensional database interactions and creating the multidimensional objects in the absence of the underlying relational database in the top-down multidimensional database interactions; and upon receiving a request to regenerate the relational schema from a set of cubes and dimensions, accessing the modifications and applying the modifications to the regenerated relational schema so that the modifications are preserved; and modifying the cubes and dimensions and generating a modified schema reflecting the changes to the cubes and dimensions and preserving the modifications made to the relational schema a conflict component that retrieves information from a user regarding how to proceed if regeneration will cause data loss.

2. The system of claim 1, further comprising a stage area database and a subject area database, wherein the stage area database receives and provides temporary storage for data from a myriad of data sources prior to being copied to the subject area database.

3. The system of claim 1, further comprising a multidimensional modification component that facilitates altering multidimensional object definitions.

4. A method, performed by a processor of a computer, of database generation to support multidimensional querying comprising:

populating database with data from one or more heterogeneous data sources;

receiving multidimensional object definitions in the absence of an underlying relational database, the multidimensional definitions comprising cube definitions;

automatically generating a relational database schema with relational objects associated with specific multidimensional objects;

receiving data concerning modifications that have been made to a previously generated relational database schema and preserving the modifications when generating an updated version of the previously generated relational database schema from a corresponding multidimensional object definition, wherein the corresponding multidimensional object definition from which the updated version of the previously generated relational database schema was generated does not contain corresponding modifications;

producing a database and applying the generated schema to the database stored in a computer readable medium;

detecting modifications to previously generated relational database schemas;

loading, by a load component, data to the database, wherein the load component comprises:

a source adaptor and a destination adaptor configured to allow connection between one or more databases;

a database load component configured to receive the data to be loaded from a data source and to load the data into the database;

a flow control component configured to analyze data in the data source and determine a proper loading sequence;

a slowly changing dimension component configured to automate handling of dimensions and other attributes that change and to specify rules for dealing with the changing attributes;

a time table generation component configured to provide multidimensional queries over a time dimension;

an error component configured to analyze the source data and/or monitor the load process to detect errors;

a log component configured to generate a log of load process operations; and a truncation component configured to remove data from the data source; and altering the generated database schema in an iterative manner, wherein modification of at least one existing multidimensional model results in at least one related alteration of a related relational schema, a related database, or combination thereof, wherein a direct modification of at least a related relational schema generated from at least one multidimensional object is preserved by schema regeneration, wherein an indirect modification of at least a related relational schema generated from at least one multidimensional object is preserved by schema regeneration, facilitating both bottom-up and top-down multidimensional database interactions such that a developer can create multidimensional objects in both directions by creating multidimensional objects over existing multidimensional objects in the bottom-up multidimensional database interactions and creating the multidimensional objects in the absence of the underlying relational database in the top-down multidimensional database interactions; and upon receiving a request to regenerate the relational schema from a set of cubes and dimensions, accessing the modifications and applying the modifications to the regenerated relational schema so that the modifications are preserved; and modifying the cubes and dimensions and generating a modified schema reflecting the changes to the cubes and dimensions and preserving the modifications made to the relational schema retrieving information from a user regarding how to proceed if regeneration will cause data loss.

5. A computer readable storage medium having stored thereon computer executable instructions for carrying out the method of claim 4.

* * * * *